(12) United States Patent
He et al.

(10) Patent No.: US 12,465,073 B2
(45) Date of Patent: Nov. 11, 2025

(54) ACTIVE POLYSACCHARIDE COMPOUND NUTRIENT WITH IMMUNITY-ENHANCING AND FATIGUE-RELIEVING ACTIVITIES AND PREPARATION THEREOF

(71) Applicants: CHINA YUNHONG HOLDINGS CO., LTD., Huanggang (CN); Yubao Li, Huanggang (CN); Jingren He, Wuhan (CN)

(72) Inventors: Jingren He, Wuhan (CN); Yubao Li, Huanggang (CN)

(73) Assignees: CHINA YUNHONG HOLDINGS CO., LTD., Hubei (CN); Yubao Li, Hubei (CN); Jingren He, Hubei (CN)

( * ) Notice: Subject to any disclaimer, the term of this patent is extended or adjusted under 35 U.S.C. 154(b) by 744 days.

(21) Appl. No.: 17/728,970

(22) Filed: Apr. 25, 2022

(65) Prior Publication Data

US 2022/0322718 A1 Oct. 13, 2022

Related U.S. Application Data

(63) Continuation of application No. PCT/CN2020/123591, filed on Oct. 26, 2020.

(30) Foreign Application Priority Data

Oct. 25, 2019 (CN) .......................... 201911025749.0

(51) Int. Cl.
| | | |
|---|---|---|
| *A61K 36/00* | (2006.01) | |
| *A23L 33/105* | (2016.01) | |
| *A23L 33/125* | (2016.01) | |
| *A23L 33/135* | (2016.01) | |
| *A23L 33/17* | (2016.01) | |
| *C12N 1/16* | (2006.01) | |

(52) U.S. Cl.
CPC .......... *A23L 33/125* (2016.08); *A23L 33/105* (2016.08); *A23L 33/135* (2016.08); *A23L 33/17* (2016.08); *C12N 1/16* (2013.01)

(58) Field of Classification Search
CPC ........................................................ A23L 33/14
See application file for complete search history.

(56) References Cited

FOREIGN PATENT DOCUMENTS

| | | | |
|---|---|---|---|
| CN | 103355698 A | 10/2013 | |
| CN | 103734662 A | 4/2014 | |
| CN | 104013657 A | 9/2014 | |
| CN | 104068302 A | 10/2014 | |
| CN | 107056962 A | 8/2017 | |
| CN | 107789479 A | * 3/2018 | ............ A61K 36/79 |
| CN | 110801012 A | 2/2020 | |

\* cited by examiner

*Primary Examiner* — Qiuwen Mi

(57) ABSTRACT

An active polysaccharide compound nutrient for boosting immunity and relieving fatigue, including 10-12 parts by weight of lentinan, 8-10 parts by weight of laminarin, 5-8 parts by weight of *Lycium barbarum*, 10-15 parts by weight of *Mytilus edulis* extract, 10-15 parts by weight of organic selenium protein powder, 8-10 parts by weight of walnut kernel, 3-5 parts by weight of black soybean powder, 2-3 parts by weight of *Panax quinquefolius* extract, 1-2 parts by weight of *Schisandra chinensis*, 1-2 parts by weight of *Ophiopogon japonicus*, 1-2 parts by weight of nutritional yeast, 5-10 parts by weight of L-arabinose, 5-8 parts by weight of xylitol and 0.2-0.3 part by weight of pancreatin. The active polysaccharide compound nutrient is prepared by subjecting raw materials to crushing, mixing, stirring, dissolving with deionized water, concentrating and drying under reduced pressure.

16 Claims, No Drawings

ACTIVE POLYSACCHARIDE COMPOUND NUTRIENT WITH IMMUNITY-ENHANCING AND FATIGUE-RELIEVING ACTIVITIES AND PREPARATION THEREOF

CROSS-REFERENCE TO RELATED APPLICATIONS

This application is a continuation of International Patent Application No. PCT/CN2020/123591, filed on Oct. 26, 2020, which claims the benefit of priority from Chinese Patent Application No. 201911025749.0, filed on Oct. 25, 2019. The content of the aforementioned applications, including any intervening amendments thereto, is incorporated herein by reference in its entirety.

TECHNICAL FIELD

This application relates to functional food and biological fermentation, and more particularly to an active polysaccharide compound nutrient with immunity-enhancing and fatigue-relieving activities and a preparation thereof.

BACKGROUND

With the increasing improvement of life quality, more and more attention has been paid to physical health. Nevertheless, the fast-paced modern lifestyle has led to unreasonable diet, lack of sleep and irregular work and rest. Excessive tension, excessive stress, lack of exercise and long-term negative emotion have led to an increase in the number of sub-health people who suffer from immunity decline and easy fatigue.

Immunity refers to the ability of the body's immune system to resist pathogenic infection. The immune system includes thymus, spleen and lymphoid tissues, and plays an important role in the body's defense to protect the body from damage, help eliminate foreign bacteria and viruses, and prevent the occurrence of diseases. The most direct manifestation of hypoimmunity is the tendency to get sick. Frequent illnesses will aggravate the body consumption, so it is often accompanied by physical weakness, malnutrition, listlessness, fatigue, appetite decrease and sleep disorders, which may lead to poor physical and mental development and predispose people to major diseases.

Fatigue is a subjective feeling of fatigue and weakness, and is not a specific symptom. Many diseases can cause fatigue, and different diseases cause different levels of fatigue. The persistent overfatigue is easy to trigger chronic pharyngitis, lymphadenectasis in neck or armpit, muscle soreness, multiple non-arthritic arthralgia, dizziness, lightheadedness, headache, etc., and eventually leads to the immunity decline. After the immunity decline, the fatigue symptom worsens, thus forming a vicious circle.

In order to enhance the immunity and relieve the fatigue, in addition to adjusting daily life habits, the supplementation of trace elements, vitamins and some oral drugs are also helpful. Whereas, these methods generally struggle with limited effect, high cost, complex composition and side effects such as drug resistance.

SUMMARY

In order to overcome the problems in the prior art, this application provides an active polysaccharide compound nutrient with immunity-enhancing and relieving fatigue activities and a preparation thereof. Through the repeated rapid heating and cooling, multi-stage enzymatic hydrolysis, UV radiation and pulsed magnetic field processing, a *Mytilus edulis* extract rich in active ingredients such as *Mytilus edulis* polysaccharides and low-molecule peptide is prepared. Moreover, a *Panax quinquefolius* extract rich in saponin is prepared through the combination of fermentation by *Aspergillus niger* and *Saccharomyces cerevisiae*, light and magnetic field. The *Mytilus edulis* extract and the *Panax quinquefolius* extract are compounded with other immunity-enhancing ingredients to achieve the immunity enhancement and fatigue relief.

Technical solutions of this application are described as follows.

In a first aspect, this application provides an active polysaccharide compound nutrient for boosting immunity and relieving fatigue, comprising:

10-12 parts by weight of lentinan;
8-10 parts by weight of laminarin;
5-8 parts by weight of *Lycium barbarum*;
10-15 parts by weight of a *Mytilus edulis* extract;
10-15 parts by weight of organic selenium protein powder;
8-10 parts by weight of walnut kernel;
3-5 parts by weight of black soybean powder;
2-3 parts by weight of a *Panax quinquefolius* extract;
1-2 parts by weight of *Schisandra chinensis*;
1-2 parts by weight of *Ophiopogon japonicus*;
1-2 parts by weight of nutritional yeast;
5-10 parts by weight of L-arabinose;
5-8 parts by weight of xylitol; and
0.2-0.3 part by weight of pancreatin.

In some embodiments, the pancreatin comprises trypsin, pancreatic amylase and pancreatic lipase in a weight ratio of 1:1.5:2.

In some embodiments, the nutritional yeast is selenium enriched yeast, chromium enriched yeast or a combination thereof.

In some embodiments, the *Mytilus edulis* extract is prepared through steps of:

(S11) subjecting *Mytilus edulis* to washing, shelling, byssus removal, grinding and freeze drying to obtain a *Mytilus edulis* freeze-dried powder;

(S12) adding 20-25 parts by weight of the *Mytilus edulis* freeze-dried powder and 150-200 parts by weight of deionized water to a reactor to obtain an enzymatic hydrolysis system; and subjecting the enzymatic hydrolysis system to enzymatic hydrolysis;

wherein the enzymatic hydrolysis comprises steps of:

(S121a) heating the enzymatic hydrolysis system to 20-25° C.; cooling the enzymatic hydrolysis system to −45° C. at a rate of 15° C./min followed by keeping at −45° C. for 1 min; heating the enzymatic hydrolysis system to 20-25° C. at a rate of 10° C./min; adding an alkaline protease to the enzymatic hydrolysis system, wherein the alkaline protease is 1% by weight of the enzymatic hydrolysis system; adjusting the enzymatic hydrolysis system to pH 7.0-9.0; and heating the enzymatic hydrolysis system to 50-60° C. followed by reaction for 5-8 h; and (S121b) adjusting the enzymatic hydrolysis system to 40-55° C.; adding a first complex enzyme, chitosan, cysteine and sodium sulfite to the enzymatic hydrolysis system followed by adjustment to pH 6.0-6.5; and subjecting the enzymatic hydrolysis system simultaneously to pulsed magnetic field treatment and UV radiation for 10-12 h;

wherein a weight ratio of the enzymatic hydrolysis system to the first complex enzyme to chitosan to cysteine to sodium sulfite is 1:0.05:0.02:0.03:0.02; the first complex enzyme is composed of phospholipase, papain and flavourzyme in a weight ratio of 1:0.5:0.5; the pulsed magnetic field treatment is performed at an intensity of 2.5-3.5 T using 20-30 pulses; and the UV radiation is performed at a power of 40 W and a wavelength of 180-280 nm for 40-60 min;

(S122a) adjusting the enzymatic hydrolysis system to 20-25° C.; cooling the enzymatic hydrolysis system to −45° C. at a rate of 10° C./min followed by keeping at −45° C. for 0.5 min; heating the enzymatic hydrolysis system to 20-25° C. at a rate of 10° C./min; adding an acid protease to the enzymatic hydrolysis system, wherein the acid protease is 0.5% by weight of the enzymatic hydrolysis system; and adjusting the enzymatic hydrolysis system to pH 4.0-6.0 and 40-50° C. followed by reaction for 3-4 h; and (S122b) adjusting the enzymatic hydrolysis system to 40-55° C.; adding a second complex enzyme, chitosan, cysteine and sodium sulfite to the enzymatic hydrolysis system followed by adjustment to pH 6.0-6.5; and subjecting the enzymatic hydrolysis system to pulsed magnetic field treatment and UV radiation for 8-10 h;

wherein a weight ratio of the enzymatic hydrolysis system to the second complex enzyme to chitosan to cysteine to sodium sulfite is 1:0.03:0.02:0.02:0.02; the second complex enzyme is composed of phospholipase, papain and flavourzyme in a weight ratio of 1:1:0.8; the pulsed magnetic field treatment is performed at an intensity of 2.0-3.0 T using 10-12 pulses; and the UV radiation is performed at a power of 40 W and a wavelength of 280-320 nm for 30-40 min; and (S123a) adjusting the enzymatic hydrolysis system to 40-55° C.; cooling the enzymatic hydrolysis system to −45° C. at a rate of 5° C./min followed by keeping at −45° C. for 0.5 min; heating the enzymatic hydrolysis system to 20-25° C. at a rate of 10° C./min; adding a neutral protease to the enzymatic hydrolysis system, wherein the neutral protease is 0.2% by weight of the enzymatic hydrolysis system; and adjusting the enzymatic hydrolysis system to pH 6.0-7.0 and 50-60° C. followed by reaction for 1-2 h; and (S123b) adjusting the enzymatic hydrolysis system to 40-55° C.; adding a third complex enzyme, chitosan, cysteine and sodium sulfite to the enzymatic hydrolysis system followed by adjustment to pH 6.0-6.5; and subjecting the enzymatic hydrolysis system to pulsed magnetic field treatment and UV radiation for 8-10 h;

wherein a weight ratio of the enzymatic hydrolysis system to the third complex enzyme to chitosan to cysteine to sodium sulfite is 1:0.02:0.01:0.02:0.02; the third complex enzyme is composed of phospholipase, papain and flavourzyme in a weight ratio of 1:1.2:1.2; the pulsed magnetic field treatment is performed at an intensity of 1.8-2.0 T using 5-8 pulses; and the UV radiation is performed at a power of 40 W and a wavelength of 320-400 nm for 20-30 min;

(S13) heating the enzymatic hydrolysis system to 90° C. followed by keeping at 90° C. for 10 min for enzyme inactivation to obtain a crude *Mytilus edulis* extract;

(S14) mixing the crude *Mytilus edulis* extract with activated carbon under stirring followed by keeping at 55° C. for 60-90 min and centrifugation to collect a supernatant, wherein the activated carbon is 3% by weight of the crude *Mytilus edulis* extract; filtering the supernatant with diatomite at a pressure of 0.25-0.35 MPa to obtain a filtrate; mixing the filtrate with activated carbon followed by standing for 45-60 min and centrifugation to obtain a purified *Mytilus edulis* extract, wherein the activated carbon is 3% by weight of the filtrate;

(S15) filtering the purified *Mytilus edulis* extract through a ceramic microfiltration membrane at 55-65° C. to obtain a first filtrate; filtering the first filtrate through a spiral-wound ultrafiltration membrane at 55-65° C. to obtain a second filtrate; concentrating the second filtrate through a spiral-wound reverse osmosis membrane at 35-40° C. to remove water, residual inorganic salts and impurities, so as to obtain a *Mytilus edulis* concentrate; and (S16) subjecting the *Mytilus edulis* concentrate to freeze-drying to obtain the *Mytilus edulis* extract.

In some embodiments, in the step (S12), 22 parts by weight of the *Mytilus edulis* freeze-dried powder and 180 parts by weight of deionized water are added;

in the step (S121a), after the alkaline protease is added, the enzymatic hydrolysis system is adjusted to pH 8.0 and 55° C. and reacted for 6 h;

in the step (S121b), the enzymatic hydrolysis system is adjusted to 50° C.; the pulsed magnetic field treatment is performed at an intensity of 3.0 T using 25 pulses for 11 h; and the UV radiation is performed for 50 min;

in the step (S122a), after the acid protease is added, the enzymatic hydrolysis system is adjusted to pH 6 and 45° C. and reacted for 3.5 h;

in the step (S122b), the enzymatic hydrolysis system is adjusted to 50° C.; the pulsed magnetic field treatment is performed at an intensity of 2.5 T using 11 pulses for 9 h; and the UV radiation is performed for 35 min;

in the step (S123a), the enzymatic hydrolysis system is adjusted to 50° C.; after the neutral protease is added, the enzymatic hydrolysis system is adjusted to pH 6.5 and 55° C. and reacted for 1.5 h;

in the step (S123b), the enzymatic hydrolysis system is adjusted to 50° C.; the pulsed magnetic field treatment is performed an intensity of 1.9 T using 6 pulses for 9 h; and the UV radiation is performed for 25 min; and in the step (S14), the crude *Mytilus edulis* extract is mixed with activated carbon under stirring, kept at 55° C. for 80 min and then centrifuged.

In some embodiments, in the step (S121b), step (S122b) and/or step (S123b), during the pulsed magnetic field treatment and the UV radiation, an ultrasonic processing is performed at a power of 100-200 W for 10-15 min.

In some embodiments, the power of the ultrasonic processing is 150 W.

In some embodiments, the *Panax quinquefolius* extract is prepared through steps of:

(S21) separately inoculating *Aspergillus niger* and *Saccharomyces cerevisiae* onto a potato dextrose agar (PDA) medium followed by activation at 28-35° C. for 48-72 h to obtain activated *Aspergillus niger* and activated *Saccharomyces cerevisiae*; culturing the activated *Aspergillus niger* in a first liquid medium to obtain an *Aspergillus niger* seed liquid; culturing the activated *Saccharomyces cerevisiae* in a second liquid medium to obtain a *Saccharomyces cerevisiae* seed liquid; subjecting the *Aspergillus niger* seed liquid to enlarged culture in a first fermentation medium at 30-35° C. under stirring at 500-800 rpm for 1-2 d to obtain an *Aspergillus niger* suspension; and subjecting the *Saccharomyces cerevisiae* seed liquid to enlarged culture in a second fermentation medium at 30-40° C. under stirring at 400-600 rpm for 1-2 d to obtain a *Saccharomyces cerevisiae* suspension;

(S22) adding 40-50 parts by weight of crushed *Panax quinquefolius*, 200-400 parts by weight of deionized water, 20-30 parts by weight of the *Aspergillus niger* suspension, 10-15 parts by weight of the *Saccharomyces cerevisiae* suspension and 20-25 parts by weight of a third fermentation medium into a reactor to obtain a fermentation system; and adjusting the fermentation system to pH 6.8-7.0; and subjecting the fermentation system to fermentation, wherein the fermentation is performed through steps of:

(S221) subjecting the fermentation system to fermentation at 25-35° C. under stirring at 300-400 rpm for 1-2 days, and simultaneously subjecting the fermentation system to illumination treatment and magnetic field treatment; wherein the illumination treatment is performed using red light with an intensity of 25-30 µmol·m$^{-2}$·s$^{-1}$ and blue light with an intensity of 30-35 µmol·m$^{-2}$·s$^{-1}$ for 40-60 min, and the magnetic field treatment is performed using a 50 Hz alternating magnetic field with an intensity of 0.4-0.8 mT for 40-60 min;

(S222) subjecting the fermentation system to fermentation at 25-35° C. under stirring at 500-600 rpm for 1-2 days, and simultaneously subjecting the fermentation system to illumination treatment and magnetic field treatment, wherein the illumination treatment is performed using red light with an intensity of 20-24 µmol·m$^{-2}$·s$^{-1}$ and blue light with an intensity of 24-28 µmol·m$^{-2}$·s$^{-1}$ for 30-40 min, and the magnetic field treatment is performed using a 50 Hz alternating magnetic field with an intensity of 0.35-0.65 mT for 30-40 min; and (S223) subjecting the fermentation system to fermentation at 25-35° C. under stirring at 300-400 rpm for 1-2 days, and simultaneously subjecting the fermentation system to illumination treatment and magnetic field treatment, wherein the illumination treatment is performed using red light with an intensity of 16-20 µmol·m$^{-2}$·s$^{-1}$ and blue light with an intensity of 20-22 µmol·m$^{-2}$·s$^{-1}$ for 20-30 min, and the magnetic field treatment is performed using a 50 Hz alternating magnetic field with an intensity of 0.25-0.55 mT for 20-30 min;

(S23) heating the fermentation system in a microwave heater at a pressure of 0.1-0.3 atmosphere and a power of 800-850 W for 40-45 min; and (S24) concentrating the fermentation system under increased pressure to reduce a volume of the fermentation system by 80-90%; cooling the fermentation system to 20-25° C. followed by filtration to obtain a liquid phase and a solid phase; dissolving the solid phase with deionized water followed by decolorization by activated carbon, vacuum drying, crushing and sieving to obtain the *Panax quinquefolius* extract.

In some embodiments, in the step (S21), the activation is performed at 32° C. for 60 h; the enlarged culture of the *Aspergillus niger* seed liquid in the first fermentation medium is performed at 32° C.; and the enlarged culture of the *Saccharomyces cerevisiae* seed liquid in the second fermentation medium is performed at 35° C.;

in the step (S22), 45 parts by weight of the crushed *Panax quinquefolius*, 300 parts by weight of deionized water, 25 parts by weight of the *Aspergillus niger* suspension, 12 parts by weight of the *Saccharomyces cerevisiae* suspension and 22 parts by weight of the third fermentation medium are added to the reactor;

in the step (S221), a temperature of the fermentation is 32° C.; the illumination treatment is performed using red light with an intensity of 28 µmol·m$^{-2}$·s$^{-1}$ and blue light with an intensity of 32 µmol·m$^{-2}$·s$^{-1}$ for 50 min; and the magnetic field treatment is performed using an alternating magnetic field with an intensity of 0.6 mT for 50 min;

in the step (S222), a temperature of the fermentation is 32° C.; the illumination treatment is performed using red light with an intensity of 22 µmol·m$^{-2}$·s$^{-1}$ and blue light with an intensity of 25 µmol·m$^{-2}$·s$^{-1}$ for 35 min; and the magnetic field treatment is performed using an alternating magnetic field with an intensity of 0.5 mT for 35 min; and in the step (S223), a temperature of the fermentation is 32° C.; the illumination treatment is performed using red light with an intensity of 18 µmol·m$^{-2}$·s$^{-1}$ and blue light with an intensity of 21 µmol·m$^{-2}$·s$^{-1}$ for 25 min; and the magnetic field treatment is performed using an alternating magnetic field with an intensity of 0.4 mT for 25 min.

In some embodiments, in the step (S21), the first fermentation medium inoculated with the *Aspergillus niger* seed liquid is subjected to ultrasonic processing for 30 min every day at a frequency of 20-40 kHz.

In a second aspect, the application provides a method of preparing the active polysaccharide compound nutrient, comprising:

(S100) weighing *Lycium barbarum*, walnut kernel, *Schisandra chinensis* and *Ophiopogon japonicus* followed by crushing; mixing lentinan, laminarin, the *Mytilus edulis* extract, organic selenium protein powder, black soybean powder and the *Panax quinquefolius* extract to obtain a mixture; dissolving the mixture with deionized water under stirring at 500-800 rpm, and adding the nutritional yeast, L-arabinose, xylitol, pancreatin and crushed *Lycium barbarum*, walnut kernel, *Schisandra chinensis* and *Ophiopogon japonicus* to the mixture while stirring to obtain a raw material mixed system; and (S200) concentrating the raw material mixed system to obtain a concentrate with a relative density of 1.20±1.22 at 60° C.; and drying the concentrate under reduced pressure to obtain the active polysaccharide compound nutrient.

In a third aspect, the application provides an application of the active polysaccharide compound nutrient in boosting immunity.

In some embodiments, the active polysaccharides compound nutrient is administered orally at a dose of 0.4 g/d·kg.

In a fourth aspect, the application provides an application of the active polysaccharide compound nutrient in relieving fatigue.

In some embodiments, the active polysaccharides compound nutrient is administered orally at a dose of 0.4 g/d·kg.

In a fifth aspect, the application provides a method of preparing a *Mytilus edulis* extract, comprising:

(S11) subjecting *Mytilus edulis* to washing, shelling, de-byssus removal, grinding and freeze drying to obtain a *Mytilus edulis* freeze-dried powder;

(S12) adding 20-25 parts by weight of the *Mytilus edulis* freeze-dried powder and 150-200 parts by weight of deionized water to a reactor to obtain an enzymatic hydrolysis system; and subjecting the enzymatic hydrolysis system to enzymatic hydrolysis;

wherein the enzymatic hydrolysis comprises steps of:

(S121a) heating the enzymatic hydrolysis system to 20-25° C.; cooling the enzymatic hydrolysis system to −45° C. at a rate of 15° C./min followed by keeping at −45° C. for 1 min; heating the enzymatic hydrolysis system to 20-25° C. at a rate of 10° C./min; adding an alkaline protease to the enzymatic hydrolysis system, wherein the alkaline protease is 1% by weight of the enzymatic hydrolysis system; adjusting the enzymatic hydrolysis system to pH 7.0-9.0; and heating the enzymatic hydrolysis system to 50-60° C. followed by reaction for 5-8 h; and (S121b) adjusting the enzymatic hydrolysis system to 40-55° C.; adding a first complex enzyme, chitosan, cysteine and sodium sulfite to the enzymatic hydrolysis system followed by adjustment to pH 6.0-6.5; and subjecting the enzymatic hydrolysis system simultaneously to pulsed magnetic field treatment and UV radiation for 10-12 h;

wherein a weight ratio of the enzymatic hydrolysis system to the first complex enzyme to chitosan to cysteine to sodium sulfite is 1:0.05:0.02:0.03:0.02; the first complex enzyme is composed of phospholipase, papain and flavourzyme in a weight ratio of 1:0.5:0.5; the pulsed magnetic field treatment is performed at an intensity of 2.5-3.5 T using 20-30 pulses; and the UV radiation is performed at a power of 40 W and a wavelength of 180-280 nm for 40-60 min;

(S122a) adjusting the enzymatic hydrolysis system to 20-25° C.; cooling the enzymatic hydrolysis system to −45° C. at a rate of 10° C./min followed by keeping at −45° C. for 0.5 min; heating the enzymatic hydrolysis system to 20-25° C. at a rate of 10° C./min; adding an acid protease to the enzymatic hydrolysis system, wherein the acid protease is 0.5% by weight of the enzymatic hydrolysis system; and adjusting the enzymatic hydrolysis system to pH 4.0-6.0 and 40-50° C. followed by reaction for 3-4 h; and (S122b) adjusting the enzymatic hydrolysis system to 40-55° C.; adding a second complex enzyme, chitosan, cysteine and sodium sulfite to the enzymatic hydrolysis system followed by adjustment to pH 6.0-6.5; and subjecting the enzymatic hydrolysis system to pulsed magnetic field treatment and UV radiation for 8-10 h;

wherein a weight ratio of the enzymatic hydrolysis system to the second complex enzyme to chitosan to cysteine to sodium sulfite is 1:0.03:0.02:0.02:0.02; the second complex enzyme is composed of phospholipase, papain and flavourzyme in a weight ratio of 1:1:0.8; the pulsed magnetic field treatment is performed at an intensity of 2.0-3.0 T using 10-12 pulses; and the UV radiation is performed at a power of 40 W and a wavelength of 280-320 nm for 30-40 min; and (S123a) adjusting the enzymatic hydrolysis system to 40-55° C.; cooling the enzymatic hydrolysis system to −45° C. at a rate of 5° C./min followed by keeping at −45° C. for 0.5 min; heating the enzymatic hydrolysis system to 20-25° C. at a rate of 10° C./min; adding a neutral protease to the enzymatic hydrolysis system, wherein the neutral protease is 0.2% by weight of the enzymatic hydrolysis system; and adjusting the enzymatic hydrolysis system to pH 6.0-7.0 and 50-60° C. followed by reaction for 1-2 h; and (S123b) adjusting the enzymatic hydrolysis system to 40-55° C.; adding a third complex enzyme, chitosan, cysteine and sodium sulfite to the enzymatic hydrolysis system followed by adjustment to pH 6.0-6.5; and subjecting the enzymatic hydrolysis system to pulsed magnetic field treatment and UV radiation for 8-10 h;

wherein a weight ratio of the enzymatic hydrolysis system to the third complex enzyme to chitosan to cysteine to sodium sulfite is 1:0.02:0.01:0.02:0.02; the third complex enzyme is composed of phospholipase, papain and flavourzyme in a weight ratio of 1:1.2:1.2; the pulsed magnetic field treatment is performed at an intensity of 1.8-2.0 T using 5-8 pulses; and the UV radiation is performed at a power of 40 W and a wavelength of 320-400 nm for 20-30 min;

(S13) heating the enzymatic hydrolysis system to 90° C. followed by keeping at 90° C. for 10 min for enzyme inactivation to obtain a crude *Mytilus edulis* extract;

(S14) mixing the crude *Mytilus edulis* extract with activated carbon under stirring followed by keeping at 55° C. for 60-90 min and centrifugation to collect a supernatant, wherein the activated carbon is 3% by weight of the crude *Mytilus edulis* extract; filtering the supernatant with diatomite at a pressure of 0.25-0.35 MPa to obtain a filtrate; mixing the filtrate with activated carbon followed by standing for 45-60 min and centrifugation to obtain a purified *Mytilus edulis* extract, wherein the activated carbon is 3% by weight of the filtrate;

(S15) filtering the purified *Mytilus edulis* extract through a ceramic microfiltration membrane at 55-65° C. to obtain a first filtrate; filtering the first filtrate through a spiral-wound ultrafiltration membrane at 55-65° C. to obtain a second filtrate; concentrating the second filtrate through a spiral-wound reverse osmosis membrane at 35-40° C. to remove water, residual inorganic salts and impurities, so as to obtain a *Mytilus edulis* concentrate; and (S16) subjecting the *Mytilus edulis* concentrate to freeze-drying to obtain the *Mytilus edulis* extract.

This application has the following beneficial effects.

Through the repeated rapid heating and cooling, multi-stage enzymatic hydrolysis, UV radiation and pulsed magnetic field treatment, active ingredients such as *Mytilus edulis* polysaccharides and low-molecule peptide are fully precipitated. The *Aspergillus niger* and *Saccharomyces cerevisiae* are subjected to fermentation to destroy a cell wall thereof and light and subjected to magnetic field treatment to improve saponin in *Panax quinquefolius* extract. The *Mytilus edulis* extract and the *Panax quinquefolius* extract are compounded with other immunity-enhancing ingredients to achieve the immunity enhancement and fatigue relief.

Other advantages, objects and features of the present disclosure will be described below, part of them will also be understood by those skilled in the art.

DETAILED DESCRIPTION OF EMBODIMENTS

Example 1

Provided herein is an active polysaccharide compound nutrient for boosting immunity and relieving fatigue, including: 10 parts by weight of lentinan, 8 parts by weight of laminarin, 5 parts by weight of *Lycium barbarum*, 10 parts by weight of *Mytilus edulis* extract, 10 parts by weight of organic selenium protein powder, 9 parts by weight of walnut kernel, 4 parts by weight of black soybean powder, 2 parts by weight of *Panax quinquefolius* extract, 1 parts by weight of *Schisandra chinensis*, 1 parts by weight of *Ophiopogon japonicus*, 1 parts by weight of nutritional yeast, 6 parts by weight of L-arabinose, 5 parts by weight of xylitol and 0.2 parts by weight of pancreatin. The nutritional yeast nutritional yeast is selenium enriched yeast, chromium enriched yeast or a combination thereof. The pancreatin includes trypsin, pancreatic amylase and pancreatic lipase in a weight ratio of 1:1.5:2.

*Mytilus edulis*, also called as mussel, is a mollusk phylum and widely distributed in China's Liaoning, Shandong, Zhejiang and other provinces along the coast. *Mytilus edulis* is abundant, tasty and nutritive, known as "marine eggs", having biological activities such as anti-coagulation, anti-tumor, and immune function regulation.

The *Mytilus edulis* extract is prepared through the following steps.

(S11) *Mytilus edulis* is subjected to washing, shelling, byssus removal, grinding and freeze drying to obtain a *Mytilus edulis* freeze-dried powder.

(S12) 20-25 (preferably 22) parts by weight of the *Mytilus edulis* freeze-dried powder and 150-200 (preferably 180) parts by weight of deionized water are added to a reactor to obtain an enzymatic hydrolysis system. The enzymatic hydrolysis system is subjected to enzymatic hydrolysis.

The enzymatic hydrolysis is performed as follows.

(S121a) The enzymatic hydrolysis system is heated to 20-25° C. The enzymatic hydrolysis system is cooled to −45° C. at a rate of 15° C./min and kept at −45° C. for 1 min. The enzymatic hydrolysis system is heated to 20-25° C. at a rate of 10° C./min. An alkaline protease is added to the enzymatic hydrolysis system, where the alkaline protease is 1% by weight of the enzymatic hydrolysis system. The enzymatic hydrolysis system is adjusted to pH 7.0-9.0 (preferably 8.0), heated to 50-60° C. (preferably 55° C.) and reacted for 5-8 h (preferably 6 h).

(S121b) The enzymatic hydrolysis system is adjusted to 40-55° C. (preferably 50° C.). A first complex enzyme, chitosan, cysteine and sodium sulfite is added to the enzymatic hydrolysis system followed by adjustment to pH 6.0-6.5. The enzymatic hydrolysis system simultaneously is subjected to pulsed magnetic field treatment and UV radiation for 10-12 h (preferably 11 h).

A weight ratio of the enzymatic hydrolysis system to the first complex enzyme to chitosan to cysteine to sodium sulfite is 1:0.05:0.02:0.03:0.02. The first complex enzyme is composed of phospholipase, papain and flavourzyme in a weight ratio of 1:0.5:0.5. The pulsed magnetic field treatment is performed at an intensity of 2.5-3.5 T (preferably 3.0 T) using 20-30 pulses (preferably 25 pulses). The UV radiation is performed at a power of 40 W and a wavelength of 180-280 nm for 40-60 min (preferably 50 min).

(S122a) The enzymatic hydrolysis system is adjusted to 20-25° C. The enzymatic hydrolysis system is cooled to −45° C. at a rate of 10° C./min followed by keeping at −45° C. for 0.5 min. The enzymatic hydrolysis system is heated to 20-25° C. at a rate of 10° C./min; adding an acid protease to the enzymatic hydrolysis system, where the acid protease is 0.5% by weight of the enzymatic hydrolysis system. The enzymatic hydrolysis system is adjusted to pH 4.0-6.0 (preferably 6.0) and 40-50° C. (preferably 45° C.) followed by reaction for 3-4 h (preferably 3.5 h).

(S122b) The enzymatic hydrolysis system is adjusted to 40-55° C. (preferably 50° C.). A second complex enzyme, chitosan, cysteine and sodium sulfite are added to the enzymatic hydrolysis system followed by adjustment to pH 6.0-6.5. The enzymatic hydrolysis system is subjected to pulsed magnetic field treatment and UV radiation for 8-10 h (preferably 9 h).

A weight ratio of the enzymatic hydrolysis system to the second complex enzyme to chitosan to cysteine to sodium sulfite is 1:0.03:0.02:0.02:0.02. The second complex enzyme is composed of phospholipase, papain and flavourzyme in a weight ratio of 1:1:0.8. The pulsed magnetic field treatment is performed at an intensity of 2.0-3.0 T (preferably 2.5 T) using 10-12 pulses (preferably 11 pulses). The UV radiation is performed at a power of 40 W and a wavelength of 280-320 nm for 30-40 min (preferably 35 min).

(S123a) The enzymatic hydrolysis system is adjusted to 40-55° C. (preferably 50° C.). The enzymatic hydrolysis system is cooled to −45° C. at a rate of 5° C./min followed by keeping at −45° C. for 0.5 min. The enzymatic hydrolysis system is heated to 20-25° C. at a rate of 10° C./min. A neutral protease is added to the enzymatic hydrolysis system, where the neutral protease is 0.2% by weight of the enzymatic hydrolysis system. The enzymatic hydrolysis system is adjusted to pH 6.0-7.0 (preferably 6.5) and 50-60° C. (preferably 55° C.) followed by reaction for 1-2 h (preferably 1.5 h).

(S123b) The enzymatic hydrolysis system is adjusted to 40-55° C. (preferably 50° C.). A third complex enzyme, chitosan, cysteine and sodium sulfite are added to the enzymatic hydrolysis system followed by adjustment to pH 6.0-6.5. The enzymatic hydrolysis system is subjected to pulsed magnetic field treatment and UV radiation for 8-10 h (preferably 9 h).

A weight ratio of the enzymatic hydrolysis system to the third complex enzyme to chitosan to cysteine to sodium sulfite is 1:0.02:0.01:0.02:0.02. the third complex enzyme is composed of phospholipase, papain and flavourzyme in a weight ratio of 1:1.2:1.2. The pulsed magnetic field treatment is performed at an intensity of 1.8-2.0 T (preferably 1.9 T) using 5-8 pulses (preferably 6 pulses). The UV radiation is performed at a power of 40 W and a wavelength of 320-400 nm for 20-30 min (preferably 25 min).

In the enzymatic hydrolysis, ice crystals are generated inside a cell membrane by rapidly cooling to −45° C. to puncture the cell membrane, and then the ice crystals are melted by rapidly heating to 20-25° C. Performing the cooling and heating repeatedly in short time will disrupt the cell membrane, leading to a precipitation of contents of the cell membrane. Various protease and flavourzyme hydrolyze precipitated large-molecule proteins to small-molecule peptides and amino acids that can be easily absorbed by body. In addition, chitosan, cysteine and sodium sulfite can change a permeability of cell membrane; phospholipase can affect the cell membrane structure by hydrolyzing proteins. The UV radiation oxidize the cell membrane; the pulsed magnetic field treatment can perforate the cell membrane. The above-mentioned contents all can change a permeability of cell membrane of the *Mytilus edulis*, leading to a precipitation of *Mytilus edulis* polysaccharides, proteins, etc., and enable an easier absorption and utilization for human body to boost immunity and relieve fatigue.

(S13) The enzymatic hydrolysis system is heated to 90° C. followed by keeping at 90° C. for 10 min for enzyme inactivation to obtain a crude *Mytilus edulis* extract.

(S14) The crude *Mytilus edulis* extract is mixed with activated carbon under stirring followed by keeping at 55° C. for 60-90 min (preferably 80 min) and centrifugation to collect a supernatant, where the activated carbon is 3% by weight of the crude *Mytilus edulis* extract. The supernatant is filtered with diatomite at a pressure of 0.25-0.35 MPa to obtain a filtrate. The filtrate is mixed with activated carbon followed by standing for 45-60 min and centrifugation to obtain a purified *Mytilus edulis* extract, where the activated carbon is 3% by weight of the filtrate.

(S15) The purified *Mytilus edulis* extract is filtered through a ceramic microfiltration membrane at 55-65° C. to obtain a first filtrate. The first filtrate is filtered through a spiral-wound ultrafiltration membrane at 55-65° C. to obtain a second filtrate. The second filtrate is concentrated through a spiral-wound reverse osmosis membrane at 35-40° C. to remove water, residual inorganic salts and impurities, so as to obtain a *Mytilus edulis* concentrate.

(S16) The *Mytilus edulis* concentrate is subjected to freeze-drying to obtain the *Mytilus edulis* extract.

In an embodiment, in the step (S121b), step (S122b) and/or step (S123b), during the pulsed magnetic field treatment and the UV radiation, an ultrasonic processing is performed at a power of 100-200 W (preferably 150 W) for 10-15 min, such that a yield is further improved.

Saponin of the *Panax quinquefolius* effectively enhances a central nervous system to achieve meditation and concentration, eliminate fatigue and enhance memory, such that it is applied to treat insomnia, irritability, memory loss and Alzheimer's disease. The *Panax quinquefolius* extract is prepared through the following steps.

(S21) *Aspergillus niger* and *Saccharomyces cerevisiae* are separately inoculated onto a potato dextrose agar (PDA) medium followed by activation at 28-35° C. (preferably 32° C.) for 48-72 h (preferably 60 h) to obtain activated *Aspergillus niger* and activated *Saccharomyces cerevisiae*. The activated *Aspergillus niger* is cultured in a first liquid medium to obtain an *Aspergillus niger* seed liquid. The activated *Saccharomyces cerevisiae* is cultured in a second liquid medium to obtain a *Saccharomyces cerevisiae* seed liquid. The *Aspergillus niger* seed liquid is subjected to enlarged culture in a first fermentation medium at 30-35° C. (preferably 32° C.) under stirring at 500-800 rpm for 1-2 d to obtain an *Aspergillus niger* suspension. The *Saccharomyces cerevisiae* seed liquid is subjected to enlarged culture in a second fermentation medium at 30-40° C. (preferably 35° C.) under stirring at 400-600 rpm for 1-2 d to obtain a *Saccharomyces cerevisiae* suspension. In an embodiment, the first fermentation medium inoculated with the *Aspergillus niger* seed liquid is subjected to ultrasonic processing for 30 min every day at a frequency of 20-40 kHz to improve a cultivation efficiency.

In the step (S11), the first liquid medium includes 1 wt % of tea polyphenol, 1.5 wt % of sucrose, 2.5 wt % of glucose, 5 wt % of malt extract, 0.1 wt % of $CoCl.6H_2O$, 0.05 wt % of $CuSO_4.5H_2O$, 2 wt % of FeNaEDTA, 0.25 wt % of $H_3BO_3$, 0.15 wt % of $Na_2MoO_4.2H_2O$, 0.1 wt % of $ZnSO_4.7H_2O$, 0.1 wt % of $MgSO_4$, 0.1 wt % of $KNO_3$, 0.2 wt % of $MnSO_4.H_2O$ and 86.95 wt % of deionized water.

In the step (S11), the second liquid medium includes 35 wt % of malt wort, 10 wt % of glucose, 15 wt % of peptone, 0.1 wt % of $ZnSO_4.7H_2O$, 0.15 wt % of $CH_3COONa$, 0.1 wt % of $MgSO_4$, 0.1 wt % of $K_2HPO_4.3H_2O$, 0.2 wt % of $MnSO_4.H_2O$ and 44.35 wt % of deionized water.

The first fermentation medium includes 10 wt % of tomato juice, 2 wt % of soluble starch, 2 wt % of sucrose, 2 wt % of glucose, 2.5 wt % of corn starch, 0.1 wt % of $FeSO_4.7H_2O$, 0.05 wt % of $MgSO_4$, 0.05 wt % of $KNO_3$, 0.1 wt % $CuCl_2.2H_2O$, 0.15 wt % of $(NH_4)_6Mo_7O_{24}.7H_2O$, 0.1 wt % of $MnSO_4.H_2O$ and 80.95 wt % of deionized water.

The second fermentation medium includes 15 wt % of bean sprout juice, 10 wt % of peptone, 8 wt % of corn starch, 10 wt % of glucose, 0.5 wt % of NaCl, 0.05 wt % of $MnSO_4$, 0.15 wt % of $K_2HPO_4.3H_2O$, 0.2 wt % of $MnSO_4.H_2O$ and 56.1 wt % of deionized water.

(S22) 40-50 (preferably 45) parts by weight of crushed *Panax quinquefolius*, 200-400 (preferably 300) parts by weight of deionized water, 20-30 (preferably 25) parts by weight of the *Aspergillus niger* suspension, 10-15 (preferably 12) parts by weight of the *Saccharomyces cerevisiae* suspension and 20-25 (preferably 22) parts by weight of a third fermentation medium are added into a reactor to obtain a fermentation system. The fermentation system is adjusted to pH 6.8-7.0.

The third fermentation medium includes 3 wt % of maltodextrin, 4.5 wt % of soybean meal powder, 5 wt % of xylose, 1 wt % of yeast extract, 0.05 wt % of $La(NO_3)_3.6H_2O$, 0.15 wt % of cellulose, 3 wt % of anhydrous ethanol, 0.15 wt % of pectase, 0.05 wt % of $MnSO_4$, 0.1 wt % of $K_2HPO_4.3H_2O$, 0.15 wt % of $NH_4NO_3$, 0.1 wt % of $MnSO_4.H_2O$ and 82.75 wt % of deionized water.

The fermentation system is subjected to fermentation, where the fermentation is performed through steps as follows.

(S221) The fermentation system is subjected to fermentation at 25-35° C. (preferably 32° C.) under stirring at 300-400 rpm for 1-2 days, and the fermentation system is simultaneously subjected to illumination treatment and magnetic field treatment. The illumination treatment is performed using red light with an intensity of 25-30 µmol·$m^{-2}·s^{-1}$ (preferably 28 µmol·$m^{-2}·s^{-1}$) and blue light with an intensity of 30-35 µmol·$m^{-2}·s^{-1}$ (preferably 32 µmol·$m^{-2}·s^{-1}$) for 40-60 min (preferably 50 min), and the magnetic field treatment is performed using a 50 Hz alternating magnetic field with an intensity of 0.4-0.8 mT (preferably 0.6 mT) for 40-60 min (preferably 50 min).

(S222) The fermentation system is subjected to fermentation at 25-35° C. (preferably 32° C.) under stirring at 500-600 rpm for 1-2 days, and the fermentation system is simultaneously subjected to illumination treatment and magnetic field treatment. The illumination treatment is performed using red light with an intensity of 20-24 µmol·$m^{-2}·s^{-1}$ (preferably 22 µmol·$m^{-2}·s^{-1}$) and blue light with an intensity of 24-28 µmol·$m^{-2}·s^{-1}$ (preferably 25 µmol·$m^{-2}·s^{-1}$) for 30-40 min (preferably 35 min), and the magnetic field treatment is performed using a 50 Hz alternating magnetic field with an intensity of 0.35-0.65 mT (preferably 0.5 mT) for 30-40 min (preferably 35 min).

(S223) The fermentation system is subjected to fermentation at 25-35° C. (preferably 32° C.) under stirring at 300-400 rpm for 1-2 days, and the fermentation system is simultaneously subjected to illumination treatment and magnetic field treatment. The illumination treatment is performed using red light with an intensity of 16-20 µmol·$m^{-2}·s^{-1}$ (preferably 18 µmol·$m^{-2}·s^{-1}$) and blue light with an intensity of 20-22 µmol·$m^{-2}·s^{-1}$ (preferably 21 µmol·$m^{-2}·s^{-1}$) for 20-30 min (preferably 25 min), and the magnetic field treatment is performed using a 50 Hz alternating magnetic field with an intensity of 0.25-0.55 mT (preferably 0.4 mT) for 20-30 min (preferably 25 min).

The *Aspergillus niger* and the *Saccharomyces cerevisiae* are both capable of producing cellulase to disrupt cell wall structure. Accordingly, *Aspergillus niger* and *Saccharomyces cerevisiae* separately are activated with specific medium and subjected to enlarged culture, then *Panax quinquefolius* is subjected to the fermentation. In the fermentation, the red light and the blue light can also promote an assimilation by regulating the permeability of cell plasma membrane and increase enzyme activity. The alternating magnetic field promotes a growth of *Aspergillus niger* and *Saccharomyces cerevisiae* through a release of calcium ions from cell membrane, further enhancing a production and activity of cellulase. Meanwhile, in order to prevent the growth of *Aspergillus niger* and *Saccharomyces cerevisiae* from adverse effects by the red light, blue light and alternating magnetic field at constant values for a long time, the light intensity of red light, blue light and alternating magnetic field are gradually reduced in each fermentation processing. Consequently, *Aspergillus niger* and *Saccharomyces cerevisiae* grow strongly to continuously and efficiently produce highly energetic cellulase, which further enhances a content of active ingredients (such as saponins) in the *Panax quinquefolius* extract.

(S23) The fermentation system is heated in a microwave heater at a pressure of 0.1-0.3 atmosphere and a power of 800-850 W for 40-45 min.

(S24) The fermentation system is concentrated under increased pressure to reduce a volume of the fermentation system by 80-90%. The fermentation system is cooled to 20-25° C. followed by filtration to obtain a liquid phase and a solid phase. The solid phase is dissolved with deionized water followed by decolorization by activated carbon, vacuum drying, crushing and sieving to obtain the *Panax quinquefolius* extract.

Example 2

Example 2 is basically the same as Example 1, except that in Example 2, the active polysaccharide compound nutrient includes: 12 parts by weight of lentinan, 10 parts by weight of laminarin, 8 parts by weight of *Lycium barbarum*, 15 parts by weight of *Mytilus edulis* extract, 12 parts by weight of organic selenium protein powder, 10 parts by weight of walnut kernel, 5 parts by weight of black soybean powder, 3 parts by weight of *Panax quinquefolius* extract, 2 parts by weight of *Schisandra chinensis*, 2 parts by weight of *Ophiopogon japonicus*, 2 parts by weight of nutritional yeast, 10 parts by weight of L-arabinose, 8 parts by weight of xylitol, 0.25 parts by weight of pancreatin and 42 parts by weight of water.

Example 3

Example 3 is basically the same as Example 1, except that in Example 3, the active polysaccharide compound nutrient includes: 11 parts by weight of lentinan, 9 parts by weight of laminarin, 7 parts by weight of *Lycium barbarum*, 12 parts by weight of *Mytilus edulis* extract, 13 parts by weight of organic selenium protein powder, 9 parts by weight of walnut kernel, 4 parts by weight of black soybean powder, 2.5 parts by weight of *Panax quinquefolius* extract, 1.5 parts by weight of *Schisandra chinensis*, 1.5 parts by weight of *Ophiopogon japonicus*, 1.5 parts by weight of nutritional yeast, 7 parts by weight of L-arabinose, 6 parts by weight of xylitol, 0.3 parts by weight of pancreatin and 45 parts by weight of water.

Detection of *Mytilus edulis* Extract

*Mytilus edulis* powders are mixed with alkali liquor to adjust pH to 8.0-10.0 to obtain a mixed solution. The mixed solution is heated to 45° C. and stirred. A protease is added to the mixed solution, where the protease is 3% by weight of the *Mytilus edulis* powders. The mixed solution is subjected to enzymatic hydrolysis at 45° C. for 2 h. An enzymatic hydrolysis product is subjected to enzyme inactivation to obtain an enzymatic hydrolysis system. The enzymatic hydrolysis system is placed in a pressure pan, and pressurized to 0.3 MPa at 120° C. for 15 min followed by retaining by an ultrafiltration membrane and drying to obtain a *Mytilus edulis* extract of Comparative Example 1. The *Mytilus edulis* extract of Comparative Example 1 and the *Mytilus edulis* extract of Examples 1-3 are detected to obtain a molecular weight and molecular weight distribution of *Mytilus edulis* extracts shown in Table 1, a type and content of free amino acids shown in Table 2 as well as a content of polysaccharide and protein shown in Table 3.

TABLE 1

Molecular weight and molecular weight distribution of *Mytilus edulis* extracts

| Molecular weight range (Da) | Percentage of peak area (%, $\lambda = 220$ nm) | | | | Number-average Molecular Weight | | |
|---|---|---|---|---|---|---|---|
| | Comparative Example 2 | Example 1 | Example 2 | Example 3 | Comparative Example 1 | Comparative Example 1 | Comparative Example 2 |
| >3000 | 46.26 | 7.21 | 7.74 | 8.14 | 9257 | 3467 | 3527 |
| 3000-1000 | 36.11 | 10.67 | 10.11 | 11.17 | 2634 | 1315 | 1451 |
| 1000-500 | 10.38 | 37.42 | 38.19 | 37.43 | 884 | 735 | 751 |
| <500 | 7.25 | 44.70 | 43.96 | 43.26 | 359 | 229 | 314 |

| Molecular weight range (Da) | Number-average Molecular Weight | Mass-average Molecular Weight | | | |
|---|---|---|---|---|---|
| | Comparative Example 3 | Comparative Example 2 | Comparative Example 1 | Comparative Example 2 | Comparative Example 3 |
| >3000 | 3576 | 9415 | 3561 | 3579 | 3696 |
| 3000-1000 | 1293 | 2834 | 1416 | 1668 | 1391 |
| 1000-500 | 719 | 931 | 815 | 839 | 912 |
| <500 | 248 | 378 | 291 | 339 | 376 |

As shown in Table 1, when prepared the *Mytilus edulis* extract, a synergistic effect of various enzymes such as protease and flavourzyme contributes to decomposing large-molecule protein to smaller peptides and amino acids that are more easily absorbed by the stomach and intestines, thereby improving body immunity and relieving fatigue. As for the *Mytilus edulis* extract, an average molecular weight of protein peptide is about 800 Da, among which 82% of peptides below 1000 Da and 44% of peptides below 500 Da, facilitating a rapid and efficient absorption by gastrointestinal tract to enable a full play to its efficacy.

TABLE 2

Type and content of free amino acids of *Mytilus edulis* extracts

| | Content of Comparative Example 1 (mg/mL) | Content of Examples 1-3 (mg/mL) | | Content of Comparative Example 1 (mg/mL) | Content of Examples 1-3 (mg/mL) |
|---|---|---|---|---|---|
| Aspartic acid | 0.211 | 0.412 | Methionine* | 0.041 | 0.064 |
| Tyrosine | 0.034 | 0.102 | Isoleucine* | 0.044 | 0.063 |
| Serine | 0.089 | 0.106 | Leucine* | 0.065 | 0.089 |
| Glutamic acid | 0.217 | 0.427 | Threonine* | Not Detected | 0.113 |
| Proline | Not Detected | 0.115 | Phenylalanine* | Not Detected | 0.085 |
| Glycine | 0.421 | 0.684 | Lysine* | 0.076 | 0.125 |
| Alanine | 0.113 | 0.153 | Grade ammonia* | 0.064 | 0.089 |
| Cystine | Not Detected | 0.044 | Tryptophan* | Not Detected | 0.046 |
| Arginine | 0.135 | 0.163 | Histidine* | Not Detected | 0.053 |

As shown in Table 2, compared with Comparative Example 1, the *Mytilus edulis* extracts provided herein is able to detect 18 amino acids with a significant increase through a hydrolysis by various enzymes such as proteases and flavourzymes.

TABLE 3

Content of polysaccharide and protein of *Mytilus edulis* extracts

| | Polysaccharide (%) | Protein (%) |
|---|---|---|
| Comparative Example 1 | 45.11 ± 2.13 | 4.15 ± 0.91 |
| Example 1 | 80.11 ± 1.01 | 7.59 ± 0.19 |
| Example 2 | 81.65 ± 2.33 | 7.28 ± 1.12 |
| Example 3 | 81.47 ± 2.14 | 7.07 ± 0.93 |

As shown in Table 3, compared with Comparative Example 1, the content of polysaccharide and protein of the *Mytilus edulis* extracts provided herein increased significantly through the enzymatic hydrolysis, and polysaccharides and proteins, amino acids, etc. are active ingredients used to improve immunity and relieve physical fatigue.

Analysis of *Panax quinquefolius* Extract

*Panax quinquefolius* is crushed followed by enzymatic hydrolysis using cellulase to obtain an *Panax quinquefolius* enzymatic hydrolysis system. The *Panax quinquefolius* enzymatic hydrolysis system is subjected to enzyme inactivation and sieved. A fermentation medium containing the *Panax quinquefolius* enzymatic hydrolysis system, carbon source, nitrogen source and water is prepared, and then is inoculated an *Aspergillus oryzae* culture solution. The fermentation medium is fermented at 40-50° C. for 2-3 days to get an enzyme solution. The enzyme solution is filtered to obtain a supernatant. The supernatant is concentrated to obtain an *Panax quinquefolius* extract of Comparative Example 2. The *Panax quinquefolius* extract of Comparative Example 2 and the *Panax quinquefolius* extracts of Example 1-3 are detected to obtain a total saponin content of ginsenoside and a different ginsenoside contents (Rg1, Rg2, Rg3, Rb1, Rh1, Rh2, Re and Rf), shown as Table 4.

TABLE 4

Total saponin content of ginsenoside and different ginsenoside contents

| | Rg1 (%) | Rg2 (%) | Rg (%) | Rb1 (3/4) | Rb2 (%) | Rh1 (%) | Rh2 (%) | Re (%) | Rf (%) | Total saponin content (μg/100 mg) |
|---|---|---|---|---|---|---|---|---|---|---|
| Comparative Example 2 | 3.48 ± 1.25 | 5.65 ± 1.58 | 1.83 ± 0.67 | 10.21 ± 1.33 | 4.26 ± 0.66 | 0.78 ± 0.56 | 0.86 ± 0.48 | 6.54 ± 0.40 | 0.43 ± 0.75 | 1525 |
| Example 1 | 6.52 ± 0.32 | 15.27 ± 1.77 | 2.43 ± 0.17 | 19.38 ± 1.15 | 8.23 ± 0.38 | 2.12 ± 0.99 | 2.35 ± 0.91 | 14.66 ± 1.47 | 1.73 ± 0.49 | 4026 |
| Example 2 | 6.52 ± 0.45 | 15.27 ± 1.64 | 2.43 ± 0.23 | 20.38 ± 1.36 | 9.23 ± 1.12 | 3.12 ± 1.13 | 3.35 ± 0.38 | 15.66 ± 0.56 | 2.73 ± 0.26 | 4133 |
| Example 3 | 6.52 ± 0.18 | 15.27 ± 1.32 | 2.43 ± 0.84 | 21.38 ± 0.79 | 10.23 ± 0.80 | 4.12 ± 0.78 | 4.35 ± 0.89 | 16.66 ± 1.33 | 3.73 ± 0.37 | 4256 |

As shown in FIG. 4, the total saponin content of ginsenoside of *Panax quinquefolius* extracts of Examples 1-3 are about 2.3 times of that of Comparative Example 2, and the different ginsenoside contents (Rg1, Rg2, Rg3, Rb1, Rh1, Rh2, Re and Rf) of Examples 1-3 are increased significantly with respect to that of Comparative Example 2, indicating that the fermentation using *Aspergillus niger* and *Saccharomyces cerevisiae* as fermenting strains greatly improve a production and vitality of cellulase and further enhance the content of active ingredients (such as saponins, etc.) in the *Panax quinquefolius* extract.

Examples 4-6

Provided herein is a method of preparing the active polysaccharide compound nutrient, performed as follows.

(S100) *Lycium barbarum*, walnut kernel, *Schisandra chinensis* and *Ophiopogon japonicus* are weighed by a weight thereof in anyone of Examples 1-3 followed by crushing. Lentinan, laminarin, *Mytilus edulis* extract, organic selenium protein powder, black soybean powder and *Panax quinquefolius* extract are weighed by a weight thereof in anyone of Examples 1-3 to mix to obtain a mixture. The mixture is dissolved with deionized water under stirring at 500-800 rpm (preferably 650 rpm). the nutritional yeast, L-arabinose, xylitol, pancreatin and the *Lycium barbarum*, walnut kernel, *Schisandra chinensis* and *Ophiopogon japonicus* obtained above are added to the mixture while stirring to obtain a raw material mixed system.

(S200) The raw material mixed system is concentrated to obtain a a concentrate with a relative density of 1.20±1.22 at 60° C.; and drying the concentrate under reduced pressure to obtain the active polysaccharide compound nutrient.

Example 7

Provided herein is an active polysaccharide compound nutrient for boosting immunity and relieving fatigue, including: 10 parts by weight of lentinan, 8 parts by weight of laminarin, 5 parts by weight of *Lycium barbarum*, 10 parts by weight of *Mytilus edulis* extract, 10 parts by weight of organic selenium protein powder, 9 parts by weight of walnut kernel, 4 parts by weight of black soybean powder, 2 parts by weight of *Panax quinquefolius* extract, 1 part by weight of *Schisandra chinensis*, 1 part by weight of *Ophiopogon japonicus*, 1 part by weight of nutritional yeast, 6 parts by weight of L-arabinose, 5 parts by weight of xylitol and 0.2 part by weight of pancreatin. The nutritional yeast nutritional yeast is selenium enriched yeast, chromium enriched yeast or a combination thereof. The pancreatin includes trypsin, pancreatic amylase and pancreatic lipase in a weight ratio of 1:1.5:2.

The *Mytilus edulis* extract is prepared through the following steps.

(S11) *Mytilus edulis* is subjected to washing, shelling, byssus removal, grinding and freeze drying to obtain a *Mytilus edulis* freeze-dried powder.

(S12) 22 parts by weight of the *Mytilus edulis* freeze-dried powder and 180 parts by weight of deionized water are added to a reactor to obtain an enzymatic hydrolysis system. The enzymatic hydrolysis system is subjected to enzymatic hydrolysis.

The enzymatic hydrolysis is performed as follows.

(S121a) The enzymatic hydrolysis system is heated to 20-25° C. The enzymatic hydrolysis system is cooled to −45° C. at a rate of 15° C./min followed by keeping at −45° C. for 1 min. The enzymatic hydrolysis system is heated to 20-25° C. at a rate of 10° C./min. An alkaline protease is added to the enzymatic hydrolysis system, where the alkaline protease is 1% by weight of the enzymatic hydrolysis system. The enzymatic hydrolysis system is adjusted to pH 8.0. The enzymatic hydrolysis system is heated to 55° C. followed by reaction for 6 h.

(S121b) The enzymatic hydrolysis system is adjusted to 50° C. A first complex enzyme, chitosan, cysteine and sodium sulfite is added to the enzymatic hydrolysis system followed by adjustment to pH 6.0-6.5. The enzymatic hydrolysis system simultaneously is subjected to pulsed magnetic field treatment and UV radiation for 11 h.

A weight ratio of the enzymatic hydrolysis system to the first complex enzyme to chitosan to cysteine to sodium sulfite is 1:0.05:0.02:0.03:0.02. The first complex enzyme is composed of phospholipase, papain and flavourzyme in a weight ratio of 1:0.5:0.5. The pulsed magnetic field treatment is performed at an intensity of 3.0 T using 25 pulses. The UV radiation is performed at a power of 40 W and a wavelength of 180-280 nm for 50 min.

(S122a) The enzymatic hydrolysis system is adjusted to 20-25° C. The enzymatic hydrolysis system is cooled to −45° C. at a rate of 10° C./min followed by keeping at −45° C. for 0.5 min. The enzymatic hydrolysis system is heated to 20-25° C. at a rate of 10° C./min; adding an acid protease to the enzymatic hydrolysis system, where the acid protease is 0.5% by weight of the enzymatic hydrolysis system. The enzymatic hydrolysis system is adjusted to pH 6.5 and 45° C. followed by reaction for 3.5 h.

(S122b) The enzymatic hydrolysis system is adjusted to 50° C. A second complex enzyme, chitosan, cysteine and sodium sulfite are added to the enzymatic hydrolysis system followed by adjustment to pH 6.0-6.5. The enzymatic hydrolysis system is subjected to pulsed magnetic field treatment and UV radiation for 9 h.

A weight ratio of the enzymatic hydrolysis system to the second complex enzyme to chitosan to cysteine to sodium sulfite is 1:0.03:0.02:0.02:0.02. The second complex enzyme is composed of phospholipase, papain and flavourzyme in a weight ratio of 1:1:0.8. The pulsed magnetic field treatment is performed at an intensity of 2.5 T using 11 pulses. The UV radiation is performed at a power of 40 W and a wavelength of 280-320 nm for 35 min.

(S123a) The enzymatic hydrolysis system is adjusted to 50° C. The enzymatic hydrolysis system is cooled to −45° C. at a rate of 5° C./min followed by keeping at −45° C. for 0.5 min. The enzymatic hydrolysis system is heated to 20-25° C. at a rate of 10° C./min. A neutral protease is added to the enzymatic hydrolysis system, where the neutral protease is 0.2% by weight of the enzymatic hydrolysis system. The enzymatic hydrolysis system is adjusted to pH 6.5 and 55° C. followed by reaction for 1.5 h.

(S123b) The enzymatic hydrolysis system is adjusted to 50° C. A third complex enzyme, chitosan, cysteine and sodium sulfite are added to the enzymatic hydrolysis system followed by adjustment to pH 6.0-6.5. The enzymatic hydrolysis system is subjected to pulsed magnetic field treatment and UV radiation for 9 h.

A weight ratio of the enzymatic hydrolysis system to the third complex enzyme to chitosan to cysteine to sodium sulfite is 1:0.02:0.01:0.02:0.02. the third complex enzyme is composed of phospholipase, papain and flavourzyme in a weight ratio of 1:1.2:1.2. The pulsed magnetic field treatment is performed at an intensity of 1.9 T using 6 pulses. The UV radiation is performed at a power of 40 W and a wavelength of 320-400 nm for 25 min.

In the enzymatic hydrolysis, ice crystals are generated inside a cell membrane by rapidly cooling to −45° C. to puncture the cell membrane, and then the ice crystals are melt by rapidly heating to 20-25° C. Performing the cooling and heating repeatedly in short time will disrupt the cell membrane, leading to a precipitation of contents of the cell membrane. Various protease and flavourzyme hydrolyze precipitated large-molecule proteins to small-molecule peptides and amino acids that can be easily absorbed by body. In addition, chitosan, cysteine and sodium sulfite can change a permeability of cell membrane; phospholipase can affect the cell membrane structure by hydrolyzing proteins. The UV radiation oxidize the cell membrane; the pulsed magnetic field treatment can perforate the cell membrane. The above-mentioned contents all can change a permeability of cell membrane of the *Mytilus edulis*, leading to a precipitation of *Mytilus edulis* polysaccharides, proteins, etc., and enable an easier absorption and utilization for human body to boost immunity and relieve fatigue.

(S13) The enzymatic hydrolysis system is heated to 90° C. followed by keeping at 90° C. for 10 min for enzyme inactivation to obtain a crude *Mytilus edulis* extract.

(S14) The crude *Mytilus edulis* extract is mixed with activated carbon under stirring followed by keeping at 55° C. for 60-90 min (preferably 80 min) and centrifugation to collect a supernatant, where the activated carbon is 3% by weight of the crude *Mytilus edulis* extract. The supernatant is filtered with diatomite at a pressure of 0.25-0.35 MPa to obtain a filtrate. The filtrate is mixed with activated carbon followed by standing for 45-60 min and centrifugation to obtain a purified *Mytilus edulis* extract, where the activated carbon is 3% by weight of the filtrate.

(S15) The purified *Mytilus edulis* extract is filtered through a ceramic microfiltration membrane at 55-65° C. to obtain a first filtrate. The first filtrate is filtered through a spiral-wound ultrafiltration membrane at 55-65° C. to obtain a second filtrate. The second filtrate is concentrated through a spiral-wound reverse osmosis membrane at 35-40° C. to remove water, residual inorganic salts and impurities, so as to obtain a *Mytilus edulis* concentrate.

(S16) The *Mytilus edulis* concentrate is subjected to freeze-drying to obtain the *Mytilus edulis* extract.

In the step (S121b), step (S122b) and/or step (S123b), during the pulsed magnetic field treatment and the UV radiation, an ultrasonic processing is performed at a power of 100-200 W (preferably 150 W) for 10-15 min, such that a yield is further improved.

Saponin of the *Panax quinquefolius* effectively enhances a central nervous system to achieve meditation and concentration, eliminate fatigue and enhance memory, such that it is applied to treat insomnia, irritability, memory loss and Alzheimer's disease. The *Panax quinquefolius* extract is prepared through the following steps.

(S21) *Aspergillus niger* and *Saccharomyces cerevisiae* are separately inoculated onto a PDA medium followed by activation at 32° C. for 60 h to obtain activated *Aspergillus niger* and activated *Saccharomyces cerevisiae*. The activated *Aspergillus niger* is cultured in a first liquid medium to obtain an *Aspergillus niger* seed liquid. The activated *Saccharomyces cerevisiae* is cultured in a second liquid medium to obtain a *Saccharomyces cerevisiae* seed liquid. The *Aspergillus niger* seed liquid is subjected to enlarged culture in a first fermentation medium at 32° C. under stirring at 500-800 rpm for 1-2 d to obtain an *Aspergillus niger* suspension. The *Saccharomyces cerevisiae* seed liquid is subjected to enlarged culture in a second fermentation medium at 35° C. under stirring at 400-600 rpm for 1-2 d to obtain a *Saccharomyces cerevisiae* suspension. In an embodiment, the first fermentation medium inoculated with the *Aspergillus niger* seed liquid is subjected to ultrasonic processing for 30 min every day at a frequency of 20-40 kHz to improve a cultivation efficiency.

In the step (S11), the first liquid medium includes 1 wt % of tea polyphenol, 1.5 wt % of sucrose, 2.5 wt % of glucose, 5 wt % of malt extract, 0.1 wt % of $CoCl.6H_2O$, 0.05 wt % of $CuSO_4.5H_2O$, 2 wt % of FeNaEDTA, 0.25 wt % of $H_3BO_3$, 0.15 wt % of $Na_2MoO_4.2H_2O$, 0.1 wt % of $ZnSO_4.7H_2O$, 0.1 wt % of $MgSO_4$, 0.1 wt % of $KNO_3$ wt % of $MnSO_4.H_2O$ and 86.95 wt % of deionized water.

In the step (S11), the second liquid medium includes 35 wt % of malt wort, 10 wt % of glucose, 15 wt % of peptone, 0.1 wt % of $ZnSO_4.7H_2O$, 0.15 wt % of $CH_3COONa$, 0.1 wt % of $MgSO_4$, 0.1 wt % of $K_2HPO_4.3H_2O$, 0.2 wt % of $MnSO_4.H_2O$ and 44.35 wt % of deionized water.

The first fermentation medium includes 10 wt % of tomato juice, 2 wt % of soluble starch, 2 wt % of sucrose, 2 wt % of glucose, 2.5 wt % of corn starch, 0.1 wt % of $FeSO_4.7H_2O$, 0.05 wt % of $MgSO_4$, 0.05 wt % of $KNO_3$, 0.1 wt % of $CuCl_2.2H_2O$, 0.15 wt % of $(NH_4)_6Mo_7O_{24}.7H_2O$, 0.1 wt % of $MnSO_4.H_2O$ and 80.95 wt % of deionized water.

The second fermentation medium includes 15 wt % of bean sprout juice, 10 wt % of peptone, 8 wt % of corn starch, 10 wt % of glucose, 0.5 wt % of NaCl, 0.05 wt % of $MnSO_4$, 0.15 wt % of $K_2HPO_4.3H_2O$, 0.2 wt % of $MnSO_4.H_2O$ and 56.1 wt % of deionized water.

(S22) 45 parts by weight of crushed *Panax quinquefolius*, 300 parts by weight of deionized water, 25 parts by weight of the *Aspergillus niger* suspension, 12 parts by weight of the *Saccharomyces cerevisiae* suspension and 22 parts by weight of a third fermentation medium are added into a reactor to obtain a fermentation system. The fermentation system is adjusted to pH 6.8-7.0.

The third fermentation medium includes 3 wt % of maltodextrin, 4.5 wt % of soybean meal powder, 5 wt % of xylose, 1 wt % of yeast extract, 0.05 wt % of $La(NO_3)_3.6H_2O$, 0.15 wt % of cellulase, 3 wt % of anhydrous ethanol, 0.15 wt % of pectase, 0.05 wt % of $MnSO_4$, 0.1 wt % of $K_2HPO_4.3H_2O$, 0.15 wt of $NH_4NO_3$, 0.1 wt % of $MnSO_4.H_2O$ and 82.75 wt % of deionized water.

The fermentation system is subjected to fermentation, where the fermentation is performed through steps as follows.

(S221) The fermentation system is subjected to fermentation at 32° C. under stirring at 300-400 rpm for 1-2 days, and the fermentation system is simultaneously subjected to illumination treatment and magnetic field treatment. The illumination treatment is performed using red light with an intensity of 28 $\mu mol \cdot m^{-2} \cdot s^{-1}$ and blue light with an intensity of 32 $\mu mol \cdot m^{-2} \cdot s^{-1}$ for 50 min, and the magnetic field treatment is performed using a 50 Hz alternating magnetic field with an intensity of 0.6 mT for 50 min.

(S222) The fermentation system is subjected to fermentation at 32° C. under stirring at 500-600 rpm for 1-2 days, and the fermentation system is simultaneously subjected to illumination treatment and magnetic field treatment. The illumination treatment is performed using red light with an intensity of 22 $\mu mol \cdot m^{-2} \cdot s^{-1}$ and blue light with an intensity of 25 $\mu mol \cdot m^{-2} \cdot s^{-1}$ for 35 min, and the magnetic field treatment is performed using a 50 Hz alternating magnetic field with an intensity of 0.5 mT for 35 min.

(S223) The fermentation system is subjected to fermentation at 32° C. under stirring at 300-400 rpm for 1-2 days, and the fermentation system is simultaneously subjected to illumination treatment and magnetic field treatment. The illumination treatment is performed using red light with an intensity of 18 µmol·m$^{-2}$·s$^{-1}$ and blue light with an intensity of 21 µmol·m$^{-2}$·s$^{-1}$ for 25 min, and the magnetic field treatment is performed using a 50 Hz alternating magnetic field with an intensity of 0.4 mT for 25 min.

The *Aspergillus niger* and the *Saccharomyces cerevisiae* are both capable of producing cellulase to disrupt cell wall structure. Accordingly, *Aspergillus niger* and *Saccharomyces cerevisiae* separately are activated with specific medium and subjected to enlarged culture, then *Panax quinquefolius* is subjected to the fermentation. In the fermentation, the red light and the blue light can also promote an assimilation by regulating the permeability of cell plasma membrane and increase enzyme activity. The alternating magnetic field promotes a growth of *Aspergillus niger* and *Saccharomyces cerevisiae* through a release of calcium ions from cell membrane, further enhancing a production and activity of cellulase. Meanwhile, in order to prevent the growth of *Aspergillus niger* and *Saccharomyces cerevisiae* from adverse effects by the red light, blue light and alternating magnetic field at constant values for a long time, the light intensity of red light, blue light and alternating magnetic field are gradually reduced in each fermentation processing. Consequently, *Aspergillus niger* and *Saccharomyces cerevisiae* grow strongly to continuously and efficiently produce highly energetic cellulase, which further enhances a content of active ingredients (such as saponins) in the *Panax quinquefolius* extract.

(S23) The fermentation system is heated in a microwave heater at a pressure of 0.1-0.3 atmosphere and a power of 800-850 W for 40-45 min.

(S24) The fermentation system is concentrated under increased pressure to reduce a volume of the fermentation system by 80-90%. The fermentation system is cooled to 20-25° C. followed by filtration to obtain a liquid phase and a solid phase. The solid phase is dissolved with deionized water followed by decolorization by activated carbon, vacuum drying, crushing and sieving to obtain the *Panax quinquefolius* extract.

Experiment of Immunity-Boosting Efficacy Evaluation

Multiple female mice, aged 6 weeks, were selected and divided into 4 groups (control group, low-dose group, medium-dose group and high-dose group) by weight. A recommended dose for human of the active polysaccharides compound nutrient is 0.4 g/d·kg, and an equivalent dose for mice is 10 times of the recommended dose for human. The low-dose group, medium-dose group and high-dose group were administered with 5, 10 and 30 times of the recommended dose for human of the active polysaccharides compound nutrient by Gastric Gavage once a day, respectively. The control group was administered with distilled water by Gastric Gavage once a day. After administered 30 d, indicators were measured.

The mice were weighed at day 30 of the administration and sacrificed. Spleen and thymus of the mice were weighed. An organ coefficient was calculated. Spleen (thymus)-to-body-weight ratio=spleen (thymus) weight/body weight. A toe swelling difference was measured, shown in Table 5.

TABLE 5

Effect of active polysaccharide compound nutrient on spleen and thymus of mice

| Group | | The number of mice | Thymus weight/ body weight (mg/g) | Spleen weight/ body weight (mg/g) | Toe swelling difference |
|---|---|---|---|---|---|
| Control group | | 20 | 2.85 ± 0.27 | 4.81 ± 0.36 | 0.108 ± 0.025 |
| Low-dose group | Example 1 | 20 | 2.79 ± 0.31 | 4.87 ± 0.29 | 0.154 ± 0.034 |
| | Example 2 | 20 | 2.80 ± 0.25 | 4.83 ± 0.18 | 0.161 ± 0.024 |
| | Example 3 | 20 | 2.85 ± 0.27 | 4.88 ± 0.12 | 0.159 ± 0.034 |
| Medium-dose group | Example 1 | 20 | 2.82 ± 0.38 | 4.92 ± 0.25 | 0.209 ± 0.042 |
| | Example 2 | 20 | 2.79 ± 0.28 | 4.94 ± 0.39 | 0.215 ± 0.056 |
| | Example 3 | 20 | 2.81 ± 0.32 | 4.90 ± 0.27 | 0.211 ± 0.019 |
| High-dose group | Example 1 | 20 | 2.88 ± 0.26 | 4.88 ± 0.33 | 0.308 ± 0.069 |
| | Example 2 | 20 | 2.82 ± 0.37 | 4.92 ± 0.41 | 0.305 ± 0.013 |
| | Example 3 | 20 | 2.88 ± 0.22 | 4.85 ± 0.19 | 0.317 ± 0.018 |

As shown in Table 5, after 30-d administration of the active polysaccharide compound nutrient, the thymus ratio and spleen ratio of the low-dose group, medium-dose group and the high-dose group are not significantly different from that of the control group ($P>0.05$), indicating that the active polysaccharides compound nutrient has no adverse stimulation to the spleen and thymus, and the spleen and thymus are enabled to perform physiological functions normally.

Further, at day 30, each mouse was intraperitoneally injected with 1 ml of 20% (V/V) chicken red blood cell suspension. Peritoneal fluid was taken to drop on a slice, incubated at 37° C. for 30 min, immobilized and dyed. Then macrophages were counted by means of microscope to calculate an engulfment index and engulfment rate. The engulfment index=total number of engulfed chicken red blood cells/number of macrophages. The engulfment rate=number of macrophages engulfing chicken red blood cells/number of macrophages×100%, shown in Table 6.

TABLE 6

Effect of active polysaccharide compound nutrient on phagocytosis of macrophages of mice

| Group | | The number of mice | Engulfment rate/% | Engulfment index |
|---|---|---|---|---|
| Control group | | 20 | 32.54 ± 2.27 | 0.59 ± 0.25 |
| Low-dose group | Example 1 | 20 | 41.32 ± 3.42 | 0.91 ± 0.42 |
| | Example 2 | 20 | 41.89 ± 1.9 | 0.92 ± 0.36 |
| | Example 3 | 20 | 39.87 ± 3.4 | 0.88 ± 0.22 |
| Medium-dose group | Example 1 | 20 | 44.37 ± 3.28 | 0.99 ± 0.26 |
| | Example 2 | 20 | 45.49 ± 2.3 | 0.97 ± 0.16 |
| | Example 3 | 20 | 43.51 ± 2.0 | 1.02 ± 0.31 |
| High-dose group | Example 1 | 20 | 46.83 ± 2.66 | 1.14 ± 0.33 |
| | Example 2 | 20 | 47.43 ± 1.7 | 1.08 ± 0.24 |
| | Example 3 | 20 | 47.75 ± 1.7 | 1.13 ± 0.28 |

The phagocytosis of macrophages can be determined by the total number of macrophages of chicken red blood cell injected intraperitoneally into mice. As shown in Table 6, after 30 d of administration of the active polysaccharides compound nutrient, the engulfment rate of the low, medium and high-dose groups was significantly higher than those of the control group (P<0.05).

Experiment of Fatigue-Relieving Efficacy Evaluation 200 mice, aged 7 weeks and weighing 17-19 g, were selected and randomly divided into 4 groups (control group and low, medium and high-dose groups). The experimental groups were treated with 0.5 mL of active polysaccharides compound nutrient by Gastric Gavage once a day, and the control group was given 0.5 mL of distilled water by Gastric Gavage once a day. After administered for 20 d, indicators were measured.

a) A liver glycogen content was measured by anthrone colorimetric method after decapitation and execution of mice. A muscle glycogen content was measured by anthrone colorimetric method from both hind limbs of mice. Results were shown in Table 7.

b) Tail blood were taken to measure a blood glucose level of each mouse at rest and after swimming in 25 cm deep water with weight (3% of weight) for 60 min at (30±2°) C. Results were shown in Table 8.

c) A swimming endurance time of mice was measured, where the mice were sank into 30 cm deep water at (30±2°) C. till exhausted and could not surface for 8 s. Results were shown in Table 9.

TABLE 7

Effect of active polysaccharide compound nutrient on liver glycogen content and muscle glycogen content

| Group | | The number of mice | Liver glycogen content (mg/g) | Muscle glycogen content (mg/g) |
|---|---|---|---|---|
| Control group | | 20 | 50.07 ± 1.84 | 5.04 ± 0.07 |
| Low-dose group | Example 1 | 20 | 58.79 ± 3.43 | 5.42 ± 0.12 |
| | Example 2 | 20 | 57.63 ± 4.21 | 5.38 ± 0.13 |
| | Example 3 | 20 | 57.19 ± 2.62 | 5.41 ± 0.09 |
| Medium-dose group | Example 1 | 20 | 62.43 ± 2.96 | 5.66 ± 0.08 |
| | Example 2 | 20 | 61.74 ± 4.31 | 5.70 ± 0.06 |
| | Example 3 | 20 | 60.77 ± 4.16 | 5.66 ± 0.12 |
| High-dose group | Example 1 | 20 | 70.89 ± 4.36 | 5.98 ± 0.11 |
| | Example 2 | 20 | 72.15 ± 3.25 | 5.92 ± 0.04 |
| | Example 3 | 20 | 70.17 ± 3.89 | 5.61 ± 0.08 |

As shown in Table 7, after 20 d of administration of the active polysaccharides compound nutrient, the liver glycogen content and muscle glycogen content of the low, medium and high-dose groups are significantly increased compared to the control group, indicating that the active polysaccharides compound nutrient can improve muscle glycogen reserve, immunity and relieving fatigue.

TABLE 8

Effect of active polysaccharide compound nutrient on blood glucose level of mice

| Group | | The number of mice | Blood glucose level before swim (mg/100 mL) | Blood glucose level after 60 min swim (mg/100 mL) |
|---|---|---|---|---|
| Control group | | 20 | 112.5 ± 2.3 | 81.2 ± 3.4 |
| Low-dose group | Example 1 | 20 | 109.4 ± 3.1 | 86.7 ± 2.2 |
| | Example 2 | 20 | 111.6 ± 2.8 | 87.1 ± 4.6 |
| | Example 3 | 20 | 111.8 ± 1.6 | 85.9 ± 3.4 |
| Medium-dose group | Example 1 | 20 | 113.5 ± 2.7 | 88.4 ± 1.5 |
| | Example 2 | 20 | 109.1 ± 2.1 | 89.1 ± 3.8 |
| | Example 3 | 20 | 112.4 ± 2.8 | 89.4 ± 2.5 |
| High-dose group | Example 1 | 20 | 110.9 ± 2.4 | 90.4 ± 4.5 |
| | Example 2 | 20 | 109.8 ± 1.8 | 90.7 ± 1.7 |
| | Example 3 | 20 | 110.3 ± 2.5 | 91.7 ± 1.3 |

As shown in Table 8, the blood glucose level before swim of the four groups showed no significant difference. The blood glucose level after swim 60 min of the low, medium and high-dose groups are higher than that of the control group, indicating that the active polysaccharides compound nutrient can maintain blood sugar levels and is capable of relieving fatigue.

TABLE 9

Effect of active polysaccharide compound nutrient on swimming duration of mice

| Group | | The number of mice | Swimming duration (min) |
|---|---|---|---|
| Control group | | 20 | 119 ± 22 |
| Low-dose group | Example 1 | 20 | 134 ± 34 |
| | Example 2 | 20 | 139 ± 30 |
| | Example 3 | 20 | 138 ± 26 |
| Medium-dose group | Example 1 | 20 | 152 ± 26 |
| | Example 2 | 20 | 155 ± 22 |
| | Example 3 | 20 | 157 ± 20 |
| High-dose group | Example 1 | 20 | 163 ± 22 |
| | Example 2 | 20 | 167 ± 17 |
| | Example 3 | 20 | 168 ± 19 |

As shown in Table 9, after administered with the active polysaccharides compound nutrient, the swimming duration of mice significantly increased, indicating that the active polysaccharides compound nutrient is capable of relieving fatigue and strength building.

It should be noted that technical features in Examples 1-7 can be combined arbitrarily, and the combined technical solutions are within the scope of the disclosure.

In summary, through the repeated rapid heating and cooling, multi-stage enzymatic hydrolysis, UV radiation and pulsed magnetic field treatment, active ingredients such as *Mytilus edulis* polysaccharides and low-molecule peptide are fully precipitated. The *Aspergillus niger* and *Saccharomyces cerevisiae* are subjected to fermentation to destroy a cell wall thereof and light and subjected to magnetic field treatment to improve saponin in *Panax quinquefolius* extract. The *Mytilus edulis* extract and the *Panax quinquefolius* extract are compounded with other immunity-enhancing ingredients to achieve the immunity enhancement and fatigue relief.

Described above are merely illustrative of the disclosure, which are not intended to limit the disclosure. It should be understood that any replacements, modifications and variations made by those skilled in the art based on the content disclosed herein without departing from the spirit and scope of the disclosure shall fall within the scope of the present disclosure defined by the appended claims.

What is claimed is:

1. An active polysaccharide compound nutrient for boosting immunity and relieving fatigue, comprising:
   10-12 parts by weight of lentinan;
   8-10 parts by weight of laminarin;
   5-8 parts by weight of *Lycium barbarum*;
   10-15 parts by weight of a *Mytilus edulis* extract;
   10-15 parts by weight of organic selenium protein powder;
   8-10 parts by weight of walnut kernel;
   3-5 parts by weight of black soybean powder;
   2-3 parts by weight of a *Panax quinquefolius* extract;
   1-2 parts by weight of *Schisandra chinensis*;
   1-2 parts by weight of *Ophiopogon japonicus*;
   1-2 parts by weight of nutritional yeast;
   5-10 parts by weight of L-arabinose;
   5-8 parts by weight of xylitol; and
   0.2-0.3 part by weight of pancreatin.

2. The active polysaccharide compound nutrient of claim 1, wherein the pancreatin comprises trypsin, pancreatic amylase and pancreatic lipase in a weight ratio of 1:1.5:2.

3. The active polysaccharide compound nutrient of claim 1, wherein the nutritional yeast is selenium enriched yeast, chromium enriched yeast or a combination thereof.

4. The active polysaccharide compound nutrient of claim 1, wherein the *Mytilus edulis* extract is prepared through steps of:
   (S11) subjecting *Mytilus edulis* to washing, shelling, byssus removal, grinding and freeze drying to obtain a *Mytilus edulis* freeze-dried powder;
   (S12) adding 20-25 parts by weight of the *Mytilus edulis* freeze-dried powder and 150-200 parts by weight of deionized water to a reactor to obtain an enzymatic hydrolysis system; and subjecting the enzymatic hydrolysis system to enzymatic hydrolysis;
   wherein the enzymatic hydrolysis comprises steps of:
   (S121a) heating the enzymatic hydrolysis system to 20-25° C.; cooling the enzymatic hydrolysis system to −45° C. at a rate of 15° C./min followed by keeping at −45° C. for 1 min; heating the enzymatic hydrolysis system to 20-25° C. at a rate of 10° C./min; adding an alkaline protease to the enzymatic hydrolysis system, wherein the alkaline protease is 1% by weight of the enzymatic hydrolysis system; adjusting the enzymatic hydrolysis system to pH 7.0-9.0; and heating the enzymatic hydrolysis system to 50-60° C. followed by reaction for 5-8 h; and
   (S121b) adjusting the enzymatic hydrolysis system to 40-55° C.; adding a first complex enzyme, chitosan, cysteine and sodium sulfite to the enzymatic hydrolysis system followed by adjustment to pH 6.0-6.5; and subjecting the enzymatic hydrolysis system simultaneously to pulsed magnetic field treatment and UV radiation for 10-12 h;
   wherein a weight ratio of the enzymatic hydrolysis system to the first complex enzyme to chitosan to cysteine to sodium sulfite is 1:0.05:0.02:0.03:0.02; the first complex enzyme is composed of phospholipase, papain and flavourzyme in a weight ratio of 1:0.5:0.5; the pulsed magnetic field treatment is performed at an intensity of 2.5-3.5 T using 20-30 pulses; and the UV radiation is performed at a power of 40 W and a wavelength of 180-280 nm for 40-60 min;
   (S122a) adjusting the enzymatic hydrolysis system to 20-25° C.; cooling the enzymatic hydrolysis system to −45° C. at a rate of 10° C./min followed by keeping at −45° C. for 0.5 min; heating the enzymatic hydrolysis system to 20-25° C. at a rate of 10° C./min; adding an acid protease to the enzymatic hydrolysis system, wherein the acid protease is 0.5% by weight of the enzymatic hydrolysis system; and adjusting the enzymatic hydrolysis system to pH 4.0-6.0 and 40-50° C. followed by reaction for 3-4 h; and
   (S122b) adjusting the enzymatic hydrolysis system to 40-55° C.; adding a second complex enzyme, chitosan, cysteine and sodium sulfite to the enzymatic hydrolysis system followed by adjustment to pH 6.0-6.5; and subjecting the enzymatic hydrolysis system to pulsed magnetic field treatment and UV radiation for 8-10 h;
   wherein a weight ratio of the enzymatic hydrolysis system to the second complex enzyme to chitosan to cysteine to sodium sulfite is 1:0.03:0.02:0.02:0.02; the second complex enzyme is composed of phospholipase, papain and flavourzyme in a weight ratio of 1:1:0.8; the pulsed magnetic field treatment is performed at an intensity of 2.0-3.0 T using 10-12 pulses; and the UV radiation is performed at a power of 40 W and a wavelength of 280-320 nm for 30-40 min; and
   (S123a) adjusting the enzymatic hydrolysis system to 40-55° C.; cooling the enzymatic hydrolysis system to −45° C. at a rate of 5° C./min followed by keeping at −45° C. for 0.5 min; heating the enzymatic hydrolysis system to 20-25° C. at a rate of 10° C./min; adding a neutral protease to the enzymatic hydrolysis system, wherein the neutral protease is 0.2% by weight of the enzymatic hydrolysis system; and adjusting the enzymatic hydrolysis system to pH 6.0-7.0 and 50-60° C. followed by reaction for 1-2 h; and
   (S123b) adjusting the enzymatic hydrolysis system to 40-55° C.; adding a third complex enzyme, chitosan, cysteine and sodium sulfite to the enzymatic hydrolysis system followed by adjustment to pH 6.0-6.5; and subjecting the enzymatic hydrolysis system to pulsed magnetic field treatment and UV radiation for 8-10 h;
   wherein a weight ratio of the enzymatic hydrolysis system to the third complex enzyme to chitosan to cysteine to sodium sulfite is 1:0.02:0.01:0.02:0.02; the third complex enzyme is composed of phospholipase, papain and flavourzyme in a weight ratio of 1:1.2:1.2; the pulsed magnetic field treatment is performed at an intensity of 1.8-2.0 T using 5-8 pulses; and the UV radiation is performed at a power of 40 W and a wavelength of 320-400 nm for 20-30 min;
   (S13) heating the enzymatic hydrolysis system to 90° C. followed by keeping at 90° C. for 10 min for enzyme inactivation to obtain a crude *Mytilus edulis* extract;
   (S14) mixing the crude *Mytilus edulis* extract with activated carbon under stirring followed by keeping at 55° C. for 60-90 min and centrifugation to collect a supernatant, wherein the activated carbon is 3% by weight of the crude *Mytilus edulis* extract; filtering the supernatant with diatomite at a pressure of 0.25-0.35 MPa to obtain a filtrate; mixing the filtrate with activated carbon followed by standing for 45-60 min and centrifugation to obtain a purified *Mytilus edulis* extract, wherein the activated carbon is 3% by weight of the filtrate;
   (S15) filtering the purified *Mytilus edulis* extract through a ceramic microfiltration membrane at 55-65° C. to obtain a first filtrate; filtering the first filtrate through a spiral-wound ultrafiltration membrane at 55-65° C. to obtain a second filtrate; concentrating the second filtrate through a spiral-wound reverse osmosis membrane at 35-40° C. to remove water, residual inorganic salts and impurities, so as to obtain a *Mytilus edulis* concentrate; and (S16) subjecting the *Mytilus edulis* concentrate to freeze-drying to obtain the *Mytilus edulis* extract.

5. The active polysaccharide compound nutrient of claim 4, wherein in the step (S12), 22 parts by weight of the *Mytilus edulis* freeze-dried powder and 180 parts by weight of deionized water are added;
in the step (S121a), after the alkaline protease is added, the enzymatic hydrolysis system is adjusted to pH 8.0 and 55° C. and reacted for 6 h;
in the step (S121b), the enzymatic hydrolysis system is adjusted to 50° C.; the pulsed magnetic field treatment is performed at an intensity of 3.0 T using 25 pulses for 11 h; and the UV radiation is performed for 50 min;
in the step (S122a), after the acid protease is added, the enzymatic hydrolysis system is adjusted to pH 6.0 and 45° C. and reacted for 3.5 h;
in the step (S122b), the enzymatic hydrolysis system is adjusted to 50° C.; the pulsed magnetic field treatment is performed at an intensity of 2.5 T using 11 pulses for 9 h; and the UV radiation is performed for 35 min;
in the step (S123a), the enzymatic hydrolysis system is adjusted to 50° C.; after the neutral protease is added, the enzymatic hydrolysis system is adjusted to pH 6.5 and 55° C. and reacted for 1.5 h;
in the step (S123b), the enzymatic hydrolysis system is adjusted to 50° C.; the pulsed magnetic field treatment is performed an intensity of 1.9 T using 6 pulses for 9 h; and the UV radiation is performed for 25 min; and
in the step (S14), the crude *Mytilus edulis* extract is mixed with activated carbon under stirring, kept at 55° C. for 80 min and then centrifuged.

6. The active polysaccharide compound nutrient of claim 4, wherein in the step (S121b), step (S122b) and/or step (S123b), during the pulsed magnetic field treatment and the UV radiation, an ultrasonic processing is performed at a power of 100-200 W for 10-15 min.

7. The active polysaccharide compound nutrient of claim 6, wherein the power of the ultrasonic processing is 150 W.

8. The active polysaccharide compound nutrient of claim 1, wherein the *Panax quinquefolius* extract is prepared through steps of:
(S21) separately inoculating *Aspergillus niger* and *Saccharomyces cerevisiae* onto a potato dextrose agar (PDA) medium followed by activation at 28-35° C. for 48-72 h to obtain activated *Aspergillus niger* and activated *Saccharomyces cerevisiae*; culturing the activated *Aspergillus niger* in a first liquid medium to obtain an *Aspergillus niger* seed liquid; culturing the activated *Saccharomyces cerevisiae* in a second liquid medium to obtain a *Saccharomyces cerevisiae* seed liquid; subjecting the *Aspergillus niger* seed liquid to enlarged culture in a first fermentation medium at 30-35° C. under stirring at 500-800 rpm for 1-2 d to obtain an *Aspergillus niger* suspension; and subjecting the *Saccharomyces cerevisiae* seed liquid to enlarged culture in a second fermentation medium at 30-40° C. under stirring at 400-600 rpm for 1-2 d to obtain a *Saccharomyces cerevisiae* suspension;
(S22) adding 40-50 parts by weight of crushed *Panax quinquefolius*, 200-400 parts by weight of deionized water, 20-30 parts by weight of the *Aspergillus niger* suspension, 10-15 parts by weight of the *Saccharomyces cerevisiae* suspension and 20-25 parts by weight of a third fermentation medium into a reactor to obtain a fermentation system; and adjusting the fermentation system to pH 6.8-7.0; and
subjecting the fermentation system to fermentation, wherein the fermentation is performed through steps of:
(S221) subjecting the fermentation system to fermentation at 25-35° C. under stirring at 300-400 rpm for 1-2 days, and simultaneously subjecting the fermentation system to illumination treatment and magnetic field treatment; wherein the illumination treatment is performed using red light with an intensity of 25-30 $\mu mol \cdot m^{-2} \cdot s^{-1}$ and blue light with an intensity of 30-35 $\mu mol \cdot m^{-2} \cdot s^{-1}$ for 40-60 min, and the magnetic field treatment is performed using a 50 Hz alternating magnetic field with an intensity of 0.4-0.8 mT for 40-60 min;
(S222) subjecting the fermentation system to fermentation at 25-35° C. under stirring at 500-600 rpm for 1-2 days, and simultaneously subjecting the fermentation system to illumination treatment and magnetic field treatment, wherein the illumination treatment is performed using red light with an intensity of 20-24 $\mu mol \cdot m^{-2} \cdot s^{-1}$ and blue light with an intensity of 24-28 $\mu mol \cdot m^{-2} \cdot s^{-1}$ for 30-40 min, and the magnetic field treatment is performed using a 50 Hz alternating magnetic field with an intensity of 0.35-0.65 mT for 30-40 min; and
(S223) subjecting the fermentation system to fermentation at 25-35° C. under stirring at 300-400 rpm for 1-2 days, and simultaneously subjecting the fermentation system to illumination treatment and magnetic field treatment, wherein the illumination treatment is performed using red light with an intensity of 16-20 $\mu mol \cdot m^{-2} \cdot s^{-1}$ and blue light with an intensity of 20-22 $\mu mol \cdot m^{-2} \cdot s^{-1}$ for 20-30 min, and the magnetic field treatment is performed using a 50 Hz alternating magnetic field with an intensity of 0.25-0.55 mT for 20-30 min;
(S23) heating the fermentation system in a microwave heater at a pressure of 0.1-0.3 atmosphere and a power of 800-850 W for 40-45 min; and
(S24) concentrating the fermentation system under increased pressure to reduce a volume of the fermentation system by 80-90%; cooling the fermentation system to 20-25° C. followed by filtration to obtain a liquid phase and a solid phase; dissolving the solid phase with deionized water followed by decolorization by activated carbon, vacuum drying, crushing and sieving to obtain the *Panax quinquefolius* extract.

9. The active polysaccharide compound nutrient of claim 8, wherein in the step (S21), the activation is performed at 32° C. for 60 h; the enlarged culture of the *Aspergillus niger* seed liquid in the first fermentation medium is performed at 32° C.; and the enlarged culture of the *Saccharomyces cerevisiae* seed liquid in the second fermentation medium is performed at 35° C.;
in the step (S22), 45 parts by weight of the crushed *Panax quinquefolius*, 300 parts by weight of deionized water, 25 parts by weight of the *Aspergillus niger* suspension, 12 parts by weight of the *Saccharomyces cerevisiae* suspension and 22 parts by weight of the third fermentation medium are added to the reactor;
in the step (S221), a temperature of the fermentation is 32° C.; the illumination treatment is performed using red light with an intensity of 28 $\mu mol \cdot m^{-2} \cdot s^{-1}$ and blue light with an intensity of 32 $\mu mol \cdot m^{-2} \cdot s^{-1}$ for 50 min;

and the magnetic field treatment is performed using an alternating magnetic field with an intensity of 0.6 mT for 50 min;

in the step (S222), a temperature of the fermentation is 32° C.; the illumination treatment is performed using red light with an intensity of 22 μmol·m$^{-2}$·s$^{-1}$ and blue light with an intensity of 25 μmol·m$^{-2}$·s$^{-1}$ for 35 min; and the magnetic field treatment is performed using an alternating magnetic field with an intensity of 0.5 mT for 35 min; and in the step (S223), a temperature of the fermentation is 32° C.; the illumination treatment is performed using red light with an intensity of 18 μmol·m$^{-2}$·s$^{-1}$ and blue light with an intensity of 21 μmol·m$^{-2}$·s$^{-1}$ for 25 min; and the magnetic field treatment is performed using an alternating magnetic field with an intensity of 0.4 mT for 25 min.

10. The active polysaccharide compound nutrient of claim 8, wherein in the step (S21), the first fermentation medium inoculated with the *Aspergillus niger* seed liquid is subjected to ultrasonic processing for 30 min every day at a frequency of 20-40 kHz.

11. A method of preparing the active polysaccharide compound nutrient of claim 1, comprising:
    (S100) weighing *Lycium barbarum*, walnut kernel, *Schisandra chinensis* and *Ophiopogon japonicus* followed by crushing; mixing lentinan, laminarin, the *Mytilus edulis* extract, organic selenium protein powder, black soybean powder and the *Panax quinquefolius* extract to obtain a mixture; dissolving the mixture with deionized water under stirring at 500-800 rpm, and adding the nutritional yeast, L-arabinose, xylitol, pancreatin and crushed *Lycium barbarum*, walnut kernel, *Schisandra chinensis* and *Ophiopogon japonicus* to the mixture while stirring to obtain a raw material mixed system; and
    (S200) concentrating the raw material mixed system to obtain a concentrate with a relative density of 1.20±1.22 at 60° C.; and drying the concentrate under reduced pressure to obtain the active polysaccharide compound nutrient.

12. A method for boosting immunity in a subject in need thereof, comprising:
    administering the active polysaccharide compound nutrient of claim 1 to the subject.

13. The method of claim 12, wherein the active polysaccharide compound nutrient is administered orally at a dose of 0.4 g/d·kg.

14. A method for relieving fatigue in a subject in need thereof, comprising:
    administering the active polysaccharide compound nutrient of claim 1 to the subject.

15. The method of claim 14, wherein the active polysaccharide compound nutrient is administered orally at a dose of 0.4 g/d·kg.

16. A method of preparing a *Mytilus edulis* extract, comprising:
    (S11) subjecting *Mytilus edulis* to washing, shelling, de-byssus removal, grinding and freeze drying to obtain a *Mytilus edulis* freeze-dried powder;
    (S12) adding 20-25 parts by weight of the *Mytilus edulis* freeze-dried powder and 150-200 parts by weight of deionized water to a reactor to obtain an enzymatic hydrolysis system; and subjecting the enzymatic hydrolysis system to enzymatic hydrolysis;

wherein the enzymatic hydrolysis comprises steps of:
(S121a) heating the enzymatic hydrolysis system to 20-25° C.; cooling the enzymatic hydrolysis system to −45° C. at a rate of 15° C./min followed by keeping at −45° C. for 1 min; heating the enzymatic hydrolysis system to 20-25° C. at a rate of 10° C./min; adding an alkaline protease to the enzymatic hydrolysis system, wherein the alkaline protease is 1% by weight of the enzymatic hydrolysis system; adjusting the enzymatic hydrolysis system to pH 7.0-9.0; and heating the enzymatic hydrolysis system to 50-60° C. followed by reaction for 5-8 h; and (S121b) adjusting the enzymatic hydrolysis system to 40-55° C.; adding a first complex enzyme, chitosan, cysteine and sodium sulfite to the enzymatic hydrolysis system followed by adjustment to pH 6.0-6.5; and subjecting the enzymatic hydrolysis system simultaneously to pulsed magnetic field treatment and UV radiation for 10-12 h;

wherein a weight ratio of the enzymatic hydrolysis system to the first complex enzyme to chitosan to cysteine to sodium sulfite is 1:0.05:0.02:0.03:0.02; the first complex enzyme is composed of phospholipase, papain and flavourzyme in a weight ratio of 1:0.5:0.5; the pulsed magnetic field treatment is performed at an intensity of 2.5-3.5 T using 20-30 pulses; and the UV radiation is performed at a power of 40 W and a wavelength of 180-280 nm for 40-60 min;

(S122a) adjusting the enzymatic hydrolysis system to 20-25° C.; cooling the enzymatic hydrolysis system to −45° C. at a rate of 10° C./min followed by keeping at −45° C. for 0.5 min; heating the enzymatic hydrolysis system to 20-25° C. at a rate of 10° C./min; adding an acid protease to the enzymatic hydrolysis system, wherein the acid protease is 0.5% by weight of the enzymatic hydrolysis system; and adjusting the enzymatic hydrolysis system to pH 4.0-6.0 and 40-50° C. followed by reaction for 3-4 h; and (S122b) adjusting the enzymatic hydrolysis system to 40-55° C.; adding a second complex enzyme, chitosan, cysteine and sodium sulfite to the enzymatic hydrolysis system followed by adjustment to pH 6.0-6.5; and subjecting the enzymatic hydrolysis system to pulsed magnetic field treatment and UV radiation for 8-10 h;

wherein a weight ratio of the enzymatic hydrolysis system to the second complex enzyme to chitosan to cysteine to sodium sulfite is 1:0.03:0.02:0.02:0.02; the second complex enzyme is composed of phospholipase, papain and flavourzyme in a weight ratio of 1:1:0.8; the pulsed magnetic field treatment is performed at an intensity of 2.0-3.0 T using 10-12 pulses; and the UV radiation is performed at a power of 40 W and a wavelength of 280-320 nm for 30-40 min; and (S123a) adjusting the enzymatic hydrolysis system to 40-55° C.; cooling the enzymatic hydrolysis system to −45° C. at a rate of 5° C./min followed by keeping at −45° C. for 0.5 min; heating the enzymatic hydrolysis system to 20-25° C. at a rate of 10° C./min; adding a neutral protease to the enzymatic hydrolysis system, wherein the neutral protease is 0.2% by weight of the enzymatic hydrolysis system; and adjusting the enzymatic hydrolysis system to pH 6.0-7.0 and 50-60° C. followed by reaction for 1-2 h; and (S123b) adjusting the enzymatic hydrolysis system to 40-55° C.; adding a third complex enzyme, chitosan, cysteine and sodium sulfite to the enzymatic hydrolysis system followed by adjustment to pH 6.0-6.5; and subjecting the enzymatic hydrolysis system to pulsed magnetic field treatment and UV radiation for 8-10 h;
wherein a weight ratio of the enzymatic hydrolysis system to the third complex enzyme to chitosan to cysteine to sodium sulfite is 1:0.02:0.01:0.02:0.02; the third complex enzyme is composed of phospholipase, papain and flavourzyme in a weight ratio of 1:1.2:1.2; the pulsed magnetic field treatment is performed at an intensity of 1.8-2.0 T using 5-8 pulses; and the UV radiation is performed at a power of 40 W and a wavelength of 320-400 nm for 20-30 min;

(S13) heating the enzymatic hydrolysis system to 90° C. followed by keeping at 90° C. for 10 min for enzyme inactivation to obtain a crude *Mytilus edulis* extract;

(S14) mixing the crude *Mytilus edulis* extract with activated carbon under stirring followed by keeping at 55° C. for 60-90 min and centrifugation to collect a supernatant, wherein the activated carbon is 3% by weight of the crude *Mytilus edulis* extract; filtering the supernatant with diatomite at a pressure of 0.25-0.35 MPa to obtain a filtrate; mixing the filtrate with activated carbon followed by standing for 45-60 min and centrifugation to obtain a purified *Mytilus edulis* extract, wherein the activated carbon is 3% by weight of the filtrate;

(S15) filtering the purified *Mytilus edulis* extract through a ceramic microfiltration membrane at 55-65° C. to obtain a first filtrate; filtering the first filtrate through a spiral-wound ultrafiltration membrane at 55-65° C. to obtain a second filtrate; concentrating the second filtrate through a spiral-wound reverse osmosis membrane at 35-40° C. to remove water, residual inorganic salts and impurities, so as to obtain a *Mytilus edulis* concentrate; and (S16) subjecting the *Mytilus edulis* concentrate to freeze-drying to obtain the *Mytilus edulis* extract.

* * * * *